US010079941B2

(12) United States Patent
Dickins et al.

(10) Patent No.: US 10,079,941 B2
(45) Date of Patent: Sep. 18, 2018

(54) AUDIO CAPTURE AND RENDER DEVICE HAVING A VISUAL DISPLAY AND USER INTERFACE FOR USE FOR AUDIO CONFERENCING

(71) Applicant: Dolby Laboratories Licensing Corporation, San Francisco, CA (US)

(72) Inventors: Glenn N. Dickins, Como (AU); Gary Spittle, Hillsborough, CA (US); David Gunawan, Sydney (AU); Anthony Tucker, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 144 days.

(21) Appl. No.: 14/788,963

(22) Filed: Jul. 1, 2015

(65) Prior Publication Data

US 2016/0006879 A1    Jan. 7, 2016

Related U.S. Application Data

(60) Provisional application No. 62/021,211, filed on Jul. 7, 2014.

(51) Int. Cl.
*H04M 9/08* (2006.01)
*H04M 3/56* (2006.01)

(52) U.S. Cl.
CPC .......... *H04M 9/085* (2013.01); *H04M 3/567* (2013.01); *H04M 3/568* (2013.01)

(58) Field of Classification Search
CPC ....... H04M 3/567; H04M 3/568; H04M 9/085
See application file for complete search history.

(56) References Cited

U.S. PATENT DOCUMENTS 5,539,741 A    7/1996  Barraclough
D474,169 S    5/2003  Fletcher
(Continued)

FOREIGN PATENT DOCUMENTS

JP    2006-171226    6/2006
WO    2012/109384    8/2012
(Continued)

OTHER PUBLICATIONS

Hoshuyama, O. et al "A Robust Adaptive Beamformer for Microphone Arrays with a Blocking Matrix using Constrained Adaptive Filters" IEEE Transactions on Signal Processing, vol. 47, Issue 10, Oct. 1999, pp. 2677-2684.
(Continued)

*Primary Examiner* — Lisa Hashem

(57) ABSTRACT

A method in a soundfield-capturing endpoint and the capturing endpoint that comprises a microphone array capturing soundfield, and an input processor pre-processing and performing auditory scene analysis to detect local sound objects and positions, de-clutter the sound objects, and integrate with auxiliary audio signals to form a de-cluttered local auditory scene that has a measure of plausibility and perceptual continuity. The input processor also codes the resulting de-cluttered auditory scene to form coded scene data comprising mono audio and additional scene data to send to others. The endpoint includes an output processor generating signals for a display unit that displays a summary of the de-cluttered local auditory scene and/or a summary of activity in the communication system from received data, the display including a shaped ribbon display element that has an extent with locations on the extent representing locations and other properties of different sound objects.

18 Claims, 7 Drawing Sheets

(56) References Cited

U.S. PATENT DOCUMENTS

| | | | |
|---|---|---|---|
| 6,850,496 B1* | 2/2005 | Knappe | H04M 3/56 370/260 |
| 6,882,971 B2 | 4/2005 | Craner | |
| 7,503,006 B2 | 3/2009 | Danieli | |
| 7,864,209 B2 | 1/2011 | Jeong | |
| 8,315,366 B2 | 11/2012 | Basard | |
| 8,948,059 B2* | 2/2015 | Rodman | H04L 12/66 370/261 |
| 9,746,916 B2* | 8/2017 | Kim | G06F 3/013 |
| 9,955,280 B2* | 4/2018 | Jarvinen | H04M 3/568 |
| 2003/0118200 A1 | 6/2003 | Beaucoup | |
| 2007/0127668 A1* | 6/2007 | Ahya | H04M 3/56 379/202.01 |
| 2008/0084981 A1* | 4/2008 | Lee | H04M 1/6016 379/201.01 |
| 2008/0095077 A1* | 4/2008 | Vadlakonda | H04M 3/568 370/259 |
| 2011/0093273 A1 | 4/2011 | Lee | |
| 2011/0200183 A1* | 8/2011 | Erhart | H04M 3/568 379/202.01 |
| 2012/0005599 A1 | 1/2012 | Bastide | |
| 2012/0224023 A1* | 9/2012 | Zhan | H04M 3/568 348/14.09 |
| 2013/0156204 A1* | 6/2013 | Schulz | H04M 3/569 381/56 |
| 2014/0064526 A1* | 3/2014 | Otto | H04S 5/00 381/300 |
| 2014/0136981 A1* | 5/2014 | Xiang | H04R 3/005 715/728 |
| 2014/0226842 A1* | 8/2014 | Shenoy | H04N 7/147 381/303 |
| 2015/0063572 A1* | 3/2015 | Gleim | H04S 7/302 381/17 |
| 2015/0139426 A1* | 5/2015 | Tammi | H04R 3/005 381/17 |
| 2015/0373477 A1* | 12/2015 | Norris | H04M 1/72572 381/303 |
| 2016/0029144 A1* | 1/2016 | Cartwright | H04S 7/30 381/310 |
| 2016/0036987 A1* | 2/2016 | Cartwright | H04M 3/568 381/17 |
| 2016/0105553 A1* | 4/2016 | Forrester | H04M 3/42365 455/416 |
| 2016/0112575 A1* | 4/2016 | Kaye | H04M 3/56 455/416 |
| 2016/0196596 A1* | 7/2016 | Van Wie | H04N 7/157 705/26.41 |
| 2017/0068511 A1* | 3/2017 | Brown | G06F 3/167 |
| 2017/0163434 A1* | 6/2017 | Bathurst | H04L 12/1827 |
| 2017/0353811 A1* | 12/2017 | McGibney | H04S 7/303 |

FOREIGN PATENT DOCUMENTS

| | | |
|---|---|---|
| WO | 2013/142641 | 9/2013 |
| WO | 2013/142642 | 9/2013 |
| WO | 2013/142657 | 9/2013 |
| WO | 2013/142659 | 9/2013 |
| WO | 2013/142668 | 9/2013 |
| WO | 2013/142727 | 9/2013 |
| WO | 2013/142731 | 9/2013 |
| WO | 2014/043024 | 3/2014 |
| WO | 2014/046916 | 3/2014 |
| WO | 2014/046923 | 3/2014 |
| WO | 2014/046941 | 3/2014 |
| WO | 2014/046944 | 3/2014 |
| WO | 2014/052429 | 4/2014 |
| WO | 2014/052431 | 4/2014 |
| WO | 2014/062389 | 4/2014 |
| WO | 2014/085050 | 6/2014 |
| WO | 2014/099809 | 6/2014 |

OTHER PUBLICATIONS

Haas, Helmut, "The Influence of a Single Echo on the Audibility of Speech" JAES vol. 20 Issue 2 pp. 146-159, Mar. 1972.

Loizou, Philipos, C "Speech Enhancement: Theory and Practice, Second Edition" Feb. 25, 2013.

Yao, L. et al "FocalSpace: Multimodal Activity Tracking, Synthetic Blur and Adaptive Presentation for Video Conferencing" SUI Proceedings of the 1st Symposium on Spatial User Interaction pp. 73-76, ACM New York, USA, 2013.

* cited by examiner

AUDIO CAPTURE AND RENDER DEVICE HAVING A VISUAL DISPLAY AND USER INTERFACE FOR USE FOR AUDIO CONFERENCING

RELATED APPLICATION

This application is a conversion of, and claims priority to U.S. provisional patent application No. 62/021,211 filed Jul. 7, 2014, and titled AUDIO CAPTURE AND RENDER DEVICE HAVING A VISUAL DISPLAY AND USER INTERFACE FOR USE FOR AUDIO CONFERENCING, the contents of which are incorporated herein by reference. This application also is related to U.S. provisional patent application No. 62/020,702 filed Jul. 3, 2014 and titled "Auxiliary Augmentation of Soundfields," the contents of which are incorporated herein by reference and are part of the specification US62/021,211.

INTRODUCTION AND BACKGROUND

Field of the invention

The present disclosure relates generally to a communication system for audio conferencing (also called teleconferencing, with audio conferencing also called voice conferencing). More specifically, embodiments of the present disclosure relate to audio capture and render devices that include a display of the state of the conference, and a user interface for manipulating the audio and the display for use in audio or video conferencing systems and methods for use in endpoints for audio or video conferencing.

Background

A communication system operating as an audio or voice conferencing system allows a possibly large number of participants (also commonly called communicants and conferees, and used interchangeably herein) to communicate by voice simultaneously. The term voice conferencing system is also used to denote the voice portion of a video conferencing system such as a telepresence system. The term "conference system" it to be understood to mean an audio communication system in which a communicant receives at a node (a endpoint) audio captured at other endpoints) and sends audio captured at the code to other endpoints. A conference system may be the audio portion of a video conferencing system, unless otherwise noted.

Communicants may join a conference via their respective endpoints. The endpoints are generally provided with one or more microphones for audio input and one or more loudspeakers or headphones for audio output. The endpoints may access the conference system via a communication link, such a link including one or more of: network connections, wired telecommunication connections, wireless connection, and so forth. The phrase "endpoints coupled by a network" includes these possibilities, and also includes direct connection.

Audio capture and render device are known for use in audio-only conference endpoints and in video conference endpoints. In the remainder of this disclosure, the term "endpoint" will be used for such an audio capture and render device, typically acting as a client in client server system architecture and/or as a peer in peer-to-peer system architecture. An endpoint may also include video capture and display capabilities.

Some conferencing systems include processing to make use spatial properties of audio at an endpoint, called a soundfield-capturing endpoint that has spatial processing capabilities. An example, each remote communicant may be given different spatial properties at the soundfield-capturing endpoint. Such soundfield-capturing endpoints are known to help create a sense of presence to a listening communicant, including providing help in differentiating between different speaking communicants, and may provide for more than one remote communicant to be speaking at the same time, and still be heard. Leveling signal processing may be used to provide the same perceived loudness level to the remote speaking communicants.

A soundfield-capturing endpoint includes a microphone array and processing thereof, and may include a plurality of loudspeakers, e.g., in headphones or as two or more spatially separated loudspeakers not in headphones, together with a rendering engine to render audio data spatially to provide a listener with a sense of space.

By an auditory scene (or simply scene if the context is clear) is meant a representation of discrete sound objects present in an acoustical environment, e.g., in a room, whether a real environment, or an artificial environment, e.g., a virtual room. A sound object is also commonly called an auditory object and an audio object, and these terms are used interchangeably in the present disclosure. The acoustical environment of a typical conference room may be represented as an auditory scene of a set of sound objects, including the communicants, and so-called nuisance objects, such as background sounds, whether background human speech, background music, or other background noise that may interfere with any of the communicants. Each object has associate properties, such as in the case of a communicant, the location or direction of the communicant, whether or not the communicant is speaking, the loudness of the speech, noise parameters, and so forth.

It is also known include a microphone array in a soundfield-capturing endpoint to capture a soundfield. It is also known to carry out auditory scene analysis (ASA) on the captured soundfield to determine parameters of the local auditory scene, such as detecting and distinguishing the sound objects that are part of the scene, and determining one or more object parameters such as one or more of: whether communicant sound object is speaking, the loudness, the location, the reverberation of the sound from the sound object, the harmonicity, the noise level, gains that are usable for leveling, and, for one or more of these parameters, the levels of confidence in the measure.

It is also known to encode these parameters, to encode captured audio, and to send the parameters with the audio to a remote endpoint, e.g., via a conference server.

It is also known to include a spatial sound renderer coupled to a plurality of loudspeakers or a set of headphones so that different sound objects are perceived as sound sources emitting from respective discrete locations, either the same locations as captured at the remote endpoint, or synthetically located.

In business meetings in which audio signals (e.g., audio signals delivered by communication systems) indicative of communicant speech are reproduced, an important component of the audio processing of the signals is leveling of segments of the signals which are indicative of speech of different talkers. People speak at various levels in a meeting and it is typically necessary for an audio processing system to actively adjust the levels of different segments of an audio signal to ensure that the perceived loudness of each communicant's speech is consistent. How to carry out leveling is known in the art.

A visual display of one or more parameters for each local communicant in a local room would be useful. A simultaneous display of parameters related to the remote communicants also would have utility. Furthermore, it would be useful to provide capability for a communicant in the local room to interact with and affect the visual display. Further, it would be useful to have a visual display of information for both the remote communicants and the local communicants.

An example of a relatively expensive endpoint is an endpoint of a telepresence system that includes several life-size display screens, and one or more additional screens for control and for display of information. A spatial audio conferencing endpoint need not be a relatively expensive device. For example, a simple "speakerphone" conference endpoint is known. Such simple voice endpoints such as the familiar triangular or circular devices are popular and will remain so because of their ease of use, size, simplicity, and cost. The user interfaces of such relatively inexpensive known endpoints may not include all the information that would be beneficial for communicants. It would be beneficial to include spatial processing in such an endpoint and include a simple compact display that simultaneously and efficiently displays a plurality of properties to local communicants regarding the state of the conference, in particular, information regarding the remote and/or local communicants.

DESCRIPTION OF EMBODIMENTS OF THE INVENTION

Figure 1:
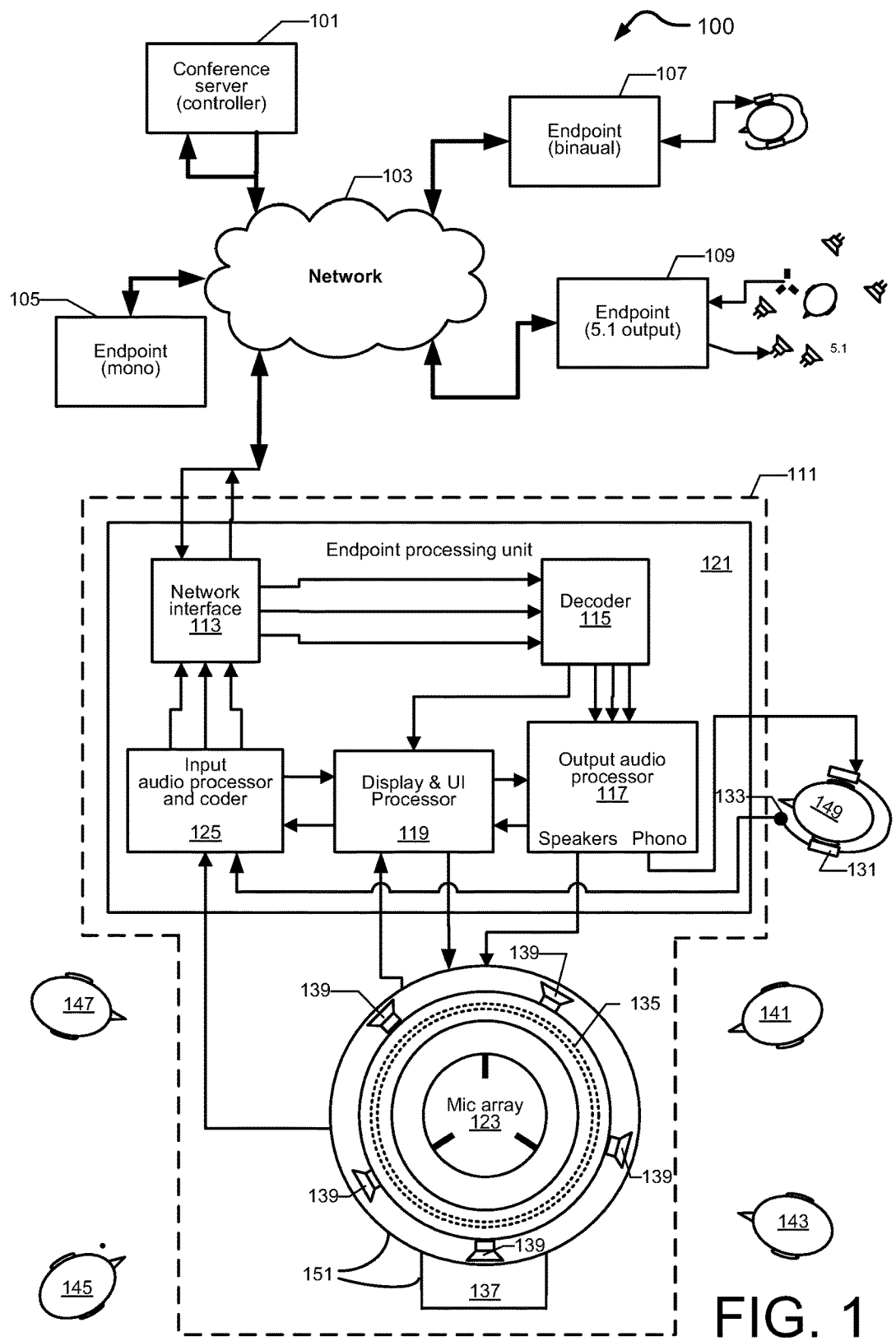
FIG. 1 shows a simplified schematic diagram of an example conferencing system 100 that includes an embodiment of the present invention.

Reference will now be made in detail to several embodiments, examples of which are illustrated in the accompanying drawings. It is noted that wherever practicable similar or like reference numbers may be used in the drawings and may indicate similar or like functionality. The drawings depict some of the possible embodiments of the disclosed system (or method) for purposes of illustration only; many embodiments of the present invention are technologically possible. It will be apparent to those of ordinary skill in the art from the present disclosure how to implement them.

Overview

Embodiments of the present invention provide a method, a device (i.e., an apparatus), a system, logic comprising executable instructions encoded in a non-transitory computer-readable medium to carry out a method on a device, and a non-transitory computer-readable medium configured with such instructions that when executed in a device carry out a method. Some embodiments of the present invention provide an endpoint and an endpoint processing method for the endpoint in an audio communication system that includes one or more endpoints, with one or more users (also called communicants, participants, and conferees). An endpoint may have one or more channels of audio input and one or more channels of audio output. The audio communication system might be the audio portion of a video communication system. One area of application is teleconferencing, so the communication system, without limitation, is called a conference system herein. Embodiments provide, in an audio capture and render device, i.e., in an endpoint, a method of generating a plurality of signals to display on an included a shaped ribbon display device, a method of and apparatus for generating the signals for the display device, and a shaped ribbon display device for receiving the generated signals.

Particular embodiments provided herein include a method in a soundfield-capturing endpoint of a communication system of capturing, analyzing, and sending a representation of the captured soundfield, and a soundfield-capturing endpoint that carries out the method. A soundfield-capturing endpoint includes a microphone array to capture the local soundfield. The method in a soundfield-capturing endpoint includes input processing the captured soundfield to carry out pre-processing and auditory scene analysis (ASA) to detect local sound objects and their relative positions, de-clutter the combination of detected sound objects, and integrate with any auxiliary audio signals to form a de-cluttered local auditory scene (of the captured soundfield) that has a measure of plausibility and perceptual continuity. The method includes coding the resulting de-cluttered auditory scene to form coded scene data comprising audio (a mono stream) and scene data (remaining data usable to re-create the local soundfield with any auxiliary input. The method in some versions further includes generating and including rendering data associated with the coded scene data, the combination of the coded scene data and rendering data called an "endpoint scene dataset." herein. The method further includes generating signals for a display unit that displays information about the de-cluttered local auditory scene on an included shaped ribbon display element that has an extent with locations on the extent representing locations of different sound objects. The objects are of the local de-cluttered auditory scene and/or of a summary of activity in the communication system ("the state of the conference") from received data. The generated display signals include the property that different sound objects are displayed at different locations on the extent of the ribbon element.

Some embodiments include a user interface accepting input from a user (also called a participant, and also called a communicant), providing capability for the user to manipulate at least one aspect of at least one member of the set consisting of {the pre-processing, the ASA, the placement of sound object in the captured scene, and one or more other characteristics of the local sound object}. In the case the endpoint includes a receiving module and the display unit displays remote sound objects in a scene of the state of the conference, the user interface also provides capability for the user to select an object and manipulate at least one aspect of the selected object. The method in one such embodiment includes accepting user input from the user interface, selecting an object according to the accepted user input, and modifying one or more aspects of the selected object according to the accepted user input.

Particular embodiments provided herein include a method in a receiving endpoint of a communication system, and a receiving endpoint of the communication system. The method includes decoding and processing received coded data of an auditory scene of remote sound objects. The received coded data is generated in remote endpoints and/or in a controller of the communication system from remote-endpoint-captured scenes and soundfields. The method includes rendering selected ones of remote sound objects of the decoded received data for output via a loudspeaker set such that a local user of the endpoint is provided with a sense of space with different sound objects of the received and rendered scene perceived as emanating from different locations. The method further includes generating signals for a display unit that displays information about the remote sound objects on an included shaped ribbon display element that has an extent with locations on the extent representing locations of the received auditory scene or summary of activity in the communication system (the "state of the conference"), the generated signals include the property that different remote sound objects are displayed at different locations on the extent of the ribbon element. In the case the receiving endpoint is also a soundfield-capturing endpoint capturing, pre-processing and analyzing a locally-captured soundfield to form local auditory scene data, an embodiment of the method further includes generating signals for the ribbon display element, or a second ribbon display element of the display unit to display information about the locally captured soundfield and local auditory scene, such that different local sound objects are displayed at different locations on the display unit.

A feature of some embodiments is the ability to capture and render auditory scenes in a way that provides an efficient method and apparatus to display communication system activity in a simple, uncluttered, meaningful way to a human communicant, so that said communicant can comprehend the state of the conference in a glance of a display unit (included in the endpoint) that has one or more ribbon display elements that each has an extent that has a shape, e.g., an oval shape, with locations along the extent representing the locations of sound captured from remote communicants (human or not) of a conference at the far endpoints. Some versions include a ribbon display element with locations thereon representing the locations of sound captured locally, e.g., from voice of the local communicants.

Some embodiments of the receiving endpoint include a user interface accepting input from a user to provide capability for the user to select a remote sound object, manipulate at least one aspect the remote sound object and/or of the displaying thereof. The method in such a receiving endpoint includes accepting user input, and responsive to the user input, selecting a remote sound object and manipulating at least one aspect the remote sound object and/or of the displaying thereof.

Provided are a method and apparatus that when operating process captured audio soundfields, spatially render sounds of remote communicants, and operate a display unit with one or more ribbon display elements that has an extent that has a shape, e.g., an oval shape, with locations along the extent representing the locations of sound captured from remote communicants (human or not) of a conference at the remote endpoints. Some versions include a ribbon display element with locations thereon representing the locations of sound captured locally, e.g., from voice of the local communicants. One feature of embodiments of the invention is that the display unit is relatively inexpensive, and is adapted to be included in a simple audio-only conference telephone that can both capture soundfields and render soundfields, so that respective sounds from two remote participants are experienced by a listening communicant as arriving from two different locations.

Additionally, provided herein is a system and method of operating a communication system and the endpoints thereof, wherein the endpoint device includes a user interface (UI) that when operating accept input from a human communicant to provide capability for said communicant to interact with the display unit. Responsive to communicant input via the user interface, the endpoint device is that when operating affect the attributes of the output spatial rendering of received sounds from remote and/or local communicants, and/or that when operating control capture and/or pre-processing incident soundfields from the local communicants.

Embodiments of the invention use auditory scene analysis (ASA), and take a scalable approach for network communications to simplify, unclutter, and make meaningful display of sound interactions throughout the length of a conference using the system.

In some embodiments, an inventive endpoint operates in a communication system that includes a controller capable of receiving and sending audio from multiple endpoints. The controller is that when operating collect endpoint scene datasets from the different endpoints and assemble the collection into a meaningful auditory scene by spatially multiplexing the sound objects determined by and arriving from different remote endpoints to form a "multiple-scene dataset" which may include rendering metadata, such that a particular endpoint receiving the multiple-scene dataset possibly with one or more directly-communicated endpoint scene datasets, and render an auditory scene from the received data to present to a communicant at the particular endpoint. The communicant at the particular endpoint also is provided with a visual representation on a display device on the particular endpoint. The auditory scene rendered to the communicant represents a conference as if the disparate endpoints were combined into a cohesive spatial representation, which typically is an artificial spatial representation and audio experience that would not exist anywhere in the physical world. The displayed information is suitable to provide to the local participant a summary of the state of the communication system "the state of the conference") typically requiring only a glance.

Embodiments of the present invention include a soundfield-capturing endpoint of a communication system. The endpoint includes a microphone array to accept a plurality of input signals from the microphone capturing a local soundfield, and is designed carry out input processing and coding comprising: (a) pre-processing and auditory scene analysis to detect local sound objects and their relative positions, (b) de-cluttering the combination of detected sound objects, (c) integrating with any auxiliary audio signals to form a de-cluttered local auditory scene that has a measure of plausibility and perceptual continuity, and (d) coding the resulting de-cluttered auditory scene to form coded scene data comprising audio (a mono stream) and scene data (remaining data usable to re-create the local soundfield with any auxiliary input). The soundfield-capturing endpoint may also generate and include rendering data associated with the coded scene data to an endpoint scene dataset. The endpoint further includes a display processor and a display unit, the display unit including a shaped ribbon display element that has an extent with locations on the extent representing locations of sound objects. The objects may be of the local de-cluttered auditory scene and/or of a summary of activity of the communication system (the "state of the conference") from received data, wherein different sound objects are displayed at different locations on the extent of the ribbon element.

Some embodiments of the capturing endpoint include a user interface accepting input from a user (also called a participant, and also called a communicant), providing capability for the user to manipulate at least one aspect of at least one member of the set consisting of {the pre-processing, the ASA, the placement of sound object in the captured scene, and one or more other characteristics of the local sound object}. In the case the endpoint includes a receiving module and the display unit displays remote sound objects in a scene of activities of the communication system, the user interface also provides capability for the user to select an object and manipulate at least one aspect of the selected object. Such an endpoint includes a UI processor and modifier that when operating accept and, responsive to user input from the user interface, to select an object according to the accepted user input, and modify one or more aspects of the selected object.

Particular embodiments provided herein include a receiving endpoint of is a communication system comprising endpoints engaged in communications, the endpoint comprising a decoder accepting coded data from remote endpoints and/or a controller of the communication system from remote-endpoint-captured scenes and soundfields, an output processor operative to render selected ones of remote sound objects in the decoded received data for output via a loudspeaker set such that a local user of the endpoint is provided with a sense of space with different sound objects the rendered auditory is perceived as emanating from different locations. The endpoint further includes a display processor and a display unit, the processor generating display signals, and the display unit including a shaped ribbon display element that has an extent with locations on the extent representing locations of sound objects, according to the display signals. The objects form a summary of the conference from decoded received data, wherein different sound objects are displayed at different locations on the extent of the ribbon element, and/or may be of a local de-cluttered auditory scene.

The method further includes generating signals for a display unit that displays information about the remote sound objects on an included shaped ribbon display element that has an extent with locations on the extent representing locations of the received auditory scene or summary of the conference, the generated signals include the property that different remote sound objects are displayed at different locations on the extent of the ribbon element. In the case the receiving endpoint is also a soundfield-capturing endpoint capturing, pre-processing, and analyzing a locally-captured soundfield to form local auditory scene data, the output processor further generates signals for the ribbon display element, or a second ribbon display element of the display unit to display information about the locally captured soundfield and local auditory scene, such that different local sound objects are displayed at different locations on the display unit.

Some embodiments include the feature that the auditory scene rendered to the communicant represents a conference as if the disparate endpoints were combined into a cohesive spatial representation, which typically is an artificial spatial representation and audio experience that would not exist anywhere in the physical world. In some embodiments, the displayed information is suitable to provide to the local participant a summary of the state of the conference, typically requiring only a glance.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

Throughout this disclosure, including in the claims, the terms "speech" and "voice" are used interchangeably, in a broad sense to denote audio content perceived as a form of communication by a human being. Thus, "speech" determined or indicated by an audio signal may be audio content of the signal which is perceived as a human utterance upon reproduction of the signal by a loudspeaker (or other sound-emitting transducer). While the main application of the presented embodiments is speech, the invention is also applicable to communicating music, e.g., in an educational conference.

Throughout this disclosure, including in the claims, the expression "segment" of an audio signal assumes that the audio signal has a duration called (the "signal duration"), and by a segment is meant a segment of the signal having a duration (the "segment duration") less than the signal duration. For example, if the signal has a waveform of a signal duration, a segment of the signal has a waveform whose segment duration is shorter than the signal duration. That is, a segment is a portion of the whole waveform.

Throughout this disclosure, including in the claims, the expression performing an operation "on" a signal or data (e.g., filtering, scaling, transforming, applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" or "unit" or "module" is used in a broad sense to denote a device, system, or subsystem. For example, a subsystem that implements a decoder may be referred to as a decoder system or decoder unit, or simply decoder, and a system including such a subsystem may also be referred to as a decoder system or decoder unit. As an example, a system includes a decoder subsystem and that generates a number output signals in response to multiple inputs, in which the subsystem generates a subset of the inputs and an external source provides the remaining inputs may also be referred to as a decoder system or decoder unit.

Throughout this disclosure including in the claims, the term "processor" is used in a broad sense to denote a system or device configured to carry out a particular function. A particular processor, e.g., an input signal processor in a system may include, or its function may be carried out by one or more programmable or otherwise configurable processor that is configured (e.g., with software or firmware) to perform operations on data (e.g., audio data). Examples of processors include a field-programmable gate array (or other configurable integrated circuit or chip set), a digital signal processor device (DSP) programmed and/or otherwise configured to perform processing on audio or other sound data, a programmable general purpose processor or computer, and a programmable microprocessor chip or chip set. While a system may be described that includes several processor units, e.g., an input signal processor, a filter processor, and an output processor, such description of three processors does not limit the system to include three separate DSP or other programmable devices. A single programmable device may be configured to carry out the processing described as separate processors herein.

FIG. 1 shows a simplified schematic diagram (block diagram) of an example conferencing system 100 that includes an embodiment of the present invention. The system 100 comprises a conference server 101 that acts as the controller for a conference that includes one or more participating endpoints 105, 107, 109, and 111, and is coupled to a network 103 (e.g., a packet network such as an Internet Protocol (IP) network, a public internetwork such as the Internet, a switched telephone network, or a private network, and so forth), and endpoints 105, 107, 109, and 111, each coupled to the network 103. More or fewer elements can be included in different systems. At least some of the endpoints are soundfield-capturing endpoints, and example of which is endpoint 111. Not all endpoints need to be identical or typically are. Some, for example, may be telephones, while others may be smart mobile telephone devices, and yet others may be systems built into a purpose-built conference room. Each endpoint may further capture and display video information, i.e., communicate audiovisual information. In FIG. 1, for example, endpoint 105 is a simple mono device, such as a telephone, endpoint 107 is a personal soundfield-capturing endpoint that includes a rendering system that can produce binaural output for headphone loudspeakers, e.g., in a headset, such that a listener listening through the headset has the sensation of sounds emanating from different locations. The headset includes one or more microphones to capture sound from the sole communicant. Endpoint 109 is also a soundfield-capturing endpoint that includes a microphone array for soundfield capture, and a rendering system that that renders 5.1 surround sound audio to produce six outputs to respective speakers arranged in a 5.1 surround sound configuration.

The present invention relates to audio capture and rendering in a conference, to the display of conference information to communicants and manipulation of such display. Features of the invention are described with reference to elements and methods carried out in example endpoint 111.

Conference data to and from the endpoint 111, including coded audio data, is transmitted and received in an agreed upon form, e.g., in the IP example, using voice over IP (VoIP) with RTP or some other protocol, using, e.g., SIP for session control. For example, the functionality of the conference server may be distributed amongst some or all endpoints. Furthermore, the invention is not limited to the architecture that uses conference server 101 that acts as the controller for a conference, and can be carried out in a point-to-point conference.

Example endpoint 111 includes an endpoint audio processor 121 comprising one or more hardware modules, programmable DSP devices structured by instructions stored therein, microprocessors and memory structured by instructions stored therein, and/or digital circuits, that when operating carry out respective functions of included elements. The elements of endpoint audio processor 121 comprise:

an input audio processor and coder 125 that when operating carry out:

accepting audio input signals from a microphone array 123 to capture a local soundfield, and, in some versions, accepting auxiliary input from at least one auxiliary microphone 133, e.g., in a headset 131 for integration with the local soundfield;

input processing the input signals, including framing, beamforming, determining frequency sub-bands, beamforming, extract the soundfield where the desired content and context exists, pre-processing for cleaning, noise suppression, echo suppression, and so forth, and further including performing auditory scene analysis (ASA) to identify sound objects in the local auditory scene, to de-clutter the local auditory scene, to form levelling data for the local auditory scene, thus forming a de-cluttered auditory scene corresponding to at the captured soundfield, wherein, in some versions, the input processing includes integrating the at least one auxiliary microphone signal with the captured soundfield such that the de-cluttered auditory scene generated by the input processing includes an auxiliary sound object, wherein in some versions, the output of the input processing includes rendering instructions in the form of metadata associated with the scene; and coding the output of the input processing to form coded scene data in the form of monophonic audio and of scene data, such the combination of audio data and the scene data is usable to re-create the local scene, optionally forming rendering data, and forming an endpoint scene dataset combining the coded scene data and the optional rendering data to send to the server 101 and/or to other endpoints via a network interface 113 that is configured to send and receive data to and from a network 103;

a decoder 115 that when operating carry out: accepting and decoding other-endpoint scene data, received from other endpoints of the system and/or a multi-scene dataset from the conference server 101 via the network interface 113, the server being operative to receive endpoint scene data from endpoints, and generate therefrom a multi-scene dataset comprising endpoint scene datasets and optionally additional rendering data se send to an endpoint;

an output audio processor 117 that when operating carry out: rendering audio and outputting rendered audio signals via one or more loudspeaker sets, including in this example via loudspeaker set 139 to a set of local communicants 141, 143, 145, and 147, and/or speakers in the headset 131 to a local communicant 149, such rendering using the decoded other-endpoint scene data and/or multi-scene dataset, selecting sound objects from the decoded information, and presenting an auditory scene of the selected sound objects in a spatial way, and;

a display and user interface (UI) processor 119 that when operating carry out:

generating and outputting display data for display on a display unit 135, which in the example embodiment 111 includes one or more ribbon display elements having an extent, each being, for example, oval-, annulus-; C-shaped, or some other suitable shape in extent.

accepting data from a user interface (UI) 137 input by a user (a local communicant) in order to modify the pre-processing and/or the sound rendering and/or output display data and/or the local de-cluttered auditory scene.

Only the audio processing side will be described in detail herein. One skilled in the art would understand that the conferencing system 100 and an endpoint such as endpoint 111 may include other elements, not shown, to also communicate one or more of video data, textual data, and other forms of data.

The Display Unit

Different embodiments of display unit 135 include one or more ribbon display elements that each have a viewable display surface having a width and an extent and that follows a shape, e.g., a circular, oval, or C-shape, and that can display different locations and one or more other properties such as spatial extent, and the intensity of the capture or render. One implementation of a display ribbon includes an array of light emitting diode (LED) devices of various colors along a channel under a frosted cover, said cover defining a display surface of the ribbon display element. Other implementations use other light sources, for example liquid crystal display components.

In one embodiment, the regions on the ribbon display elements of the endpoint's display unit 135, e.g., the locations along the length of the ribbon display elements that are arranges as a shape in extent have correspondence between the physical space wherefrom the rendered sounds may emanate or move to, and locations along the shaped extent. In some versions, the display unit 135 includes two ribbon display elements to provide two output spaces, e.g., shaped as two annuli, one for input sources (sound objects of the local de-cluttered auditory scene), and another for output sources (sound objects of a summary of the overall conference). In such an embodiment, there is a 1:1 correspondence with the physical or artificially created area around the endpoint device, e.g., around the microphone array 123, wherefrom a communicant may be speaking, and the extent of the input-source ribbon display element. So for example, a sound which may be constrained to move in the forward direction for a communicant with a headset would be an arc, whereas the receipt of sound at a location around a central microphone array would be represented by an annulus or similar shape whose indications cover a range of angles around that device.

In general, the one or more ribbon display elements that each have a shape in extent, and are configured to display at least an indication of the location of a sound source and also indications of one or more additional items of information, including an indication of signal energy. The indications the additional items of information may use color coding, width or other physical dimension of the indication, shape of the indication, and time patterns of intensity change, such as on and off, or a variety of intensities, at different rates and different intensity change intervals.

Such additional information may include the type of sound object, e.g., whether a person, a non-human communicant, or noise, the communicant identity, whether the communicant is active, e.g., speaking or not.

An alternative embodiment of the display unit uses a two-dimensional (2-D) screen. Such a 2-D screen provides for using a combination of context of operation. For example, a display representing the receive soundfield presented to a communicant wearing headphones may be represented on a 2-D screen as a shape extending forward, as if the remote communicant is looking at a screen or a forward projected arc.

While it is known to display characteristics of a conference to a participant, a conventional display that includes information about the location and state of communicants of a conference may have a degree of clutter or complexity information which is not of value to a communicant during a conference. A feature of some embodiments of the invention is the displaying of simplified information that summarizes the state of a conference in a way that is suitable for comprehension by simply a glance.

One feature of embodiments of the invention is the combination in a soundfield-capturing endpoint of processing to produce a simple uncluttered view of a conference on a display unit, and input audio processing of a captured soundfield that includes auditory scene analysis (ASA). Another feature of some embodiments is the provisions for user input and control.

Aspects of the invention relate to the one or both of the receive-side processing and the send-side processing of endpoints. Different embodiments of an endpoint may include or some, but not all, of the elements and functions described herein.

The Send-Side Input Processing of an Example Soundfield-Capturing Endpoint

While the send-side input processing of a spatial endpoint may affect (and be affected by) the receive-side processing, we first described the send-side processing of a soundfield-capturing endpoint without any data received via the network 103 from other endpoint(s) and/or the server 101.

Figure 2:
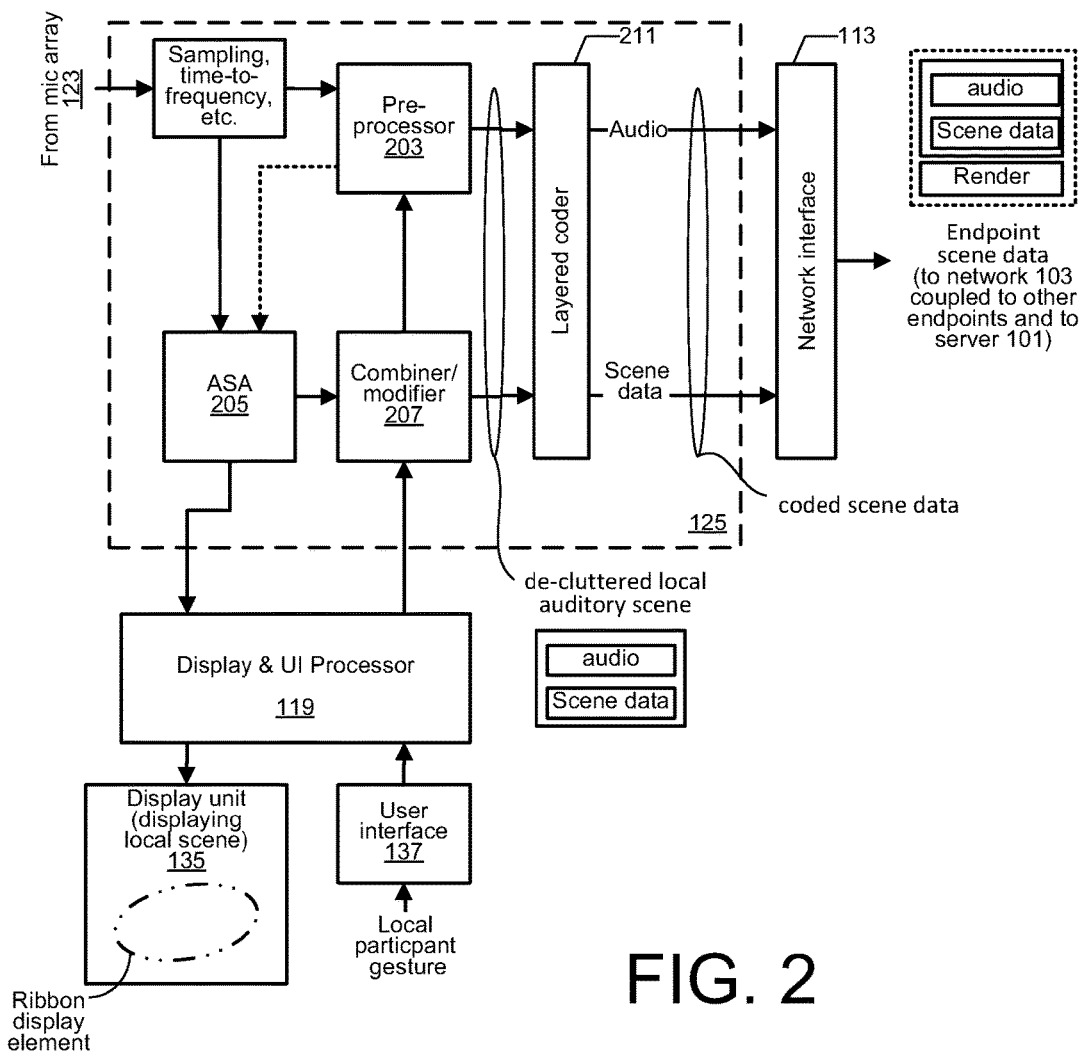
FIG. 2 shows in more detail a block diagram of one example embodiment of the send-side of an input processor and coder of a soundfield-capturing endpoint that includes an embodiment of the present invention.
Figure 3:
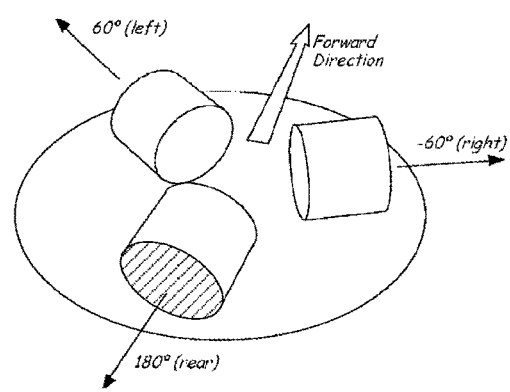
FIG. 3 shows a microphone array in the form of a cluster of three cardioid microphones at azimuth angles of 60°, −60°, and 180°, respectively, measured counterclockwise from an X-axis pointing towards the front, e.g., to the source of voice.

FIG. 2 shows input audio processor and coder 125 in more detail. The microphone array 123 of three or more microphones provides audio input signals in some format, e.g., in the case of including spatial information, in one of a binaural format, a soundfield format, a surround-sound format, and as set of signals from a microphone array. We call this captured data a captured soundfield. There may also be provision for additional input ("auxiliary input") from other input signal sources, e.g., the microphone of a headset 131, as shown for communicant 149. In the example of FIG. 1, the array 123 includes a cluster of three cardioid microphones at azimuth angles of 60°, −60°, and 180°, respectively, measured counterclockwise from an X-axis pointing towards the front, e.g., to the source of voice, as shown in FIG. 3. The soundfield, in two dimensions, from such a cluster, may be transported as three signals, commonly denoted L, R, and S for the cardioid microphone signals at of 60°, −60° and 180°, respectively. More or fewer microphones may be used in the microphone array, e.g., four or more to capture a three-dimensional soundfield, or some other signals from the microphone array 123. The microphone signals may also be generated in some other coordinate system, e.g., as the set of signals from a microphone array, e.g., as the set of signals denoted E1, E2, . . . EM for an M-microphone array, or in so-called B-Format in which, for the first-order 2-D case (horizontal B-format), includes three signals, individually named W, X, and Y, that correspond to an omnidirectional microphone signal (W) along with two dipole microphone signals (X and Y) that have their maximum positive gains aligned with the X and Y axes respectively.

The input processing of input audio processor and coder 125 is configured to accept (as input audio) the captured audio signals that are output from microphone array 123 and/or auxiliary input from microphone 133, and to carry out processing of the audio signals to generate a bitstream of coded audio referred to herein as an endpoint dataset, comprising coded scene data and optional rendering data. In one embodiment, the processing of processor 125 includes sampling the input audio, forming frames (also called blocks) of samples, e.g., with an overlap, performing a time-domain to transform-domain, e.g., to frequency-domain transform on the frames of samples, thus generating multi-channel audio input for the input processing. Such processing would be well known to those skilled in the art. See also the section included herein below in this description titled "Using known methodologies."

One embodiment of the input audio processor and coder 125 includes a pre-processing path that includes a pre-processor 203 that when operating carrying out one or more pre-processing functions on the multi-channel audio input to form pre-processed audio. The pre-processing functions include one or more of beamforming, noise suppression, and/or acoustic echo suppression (or acoustic echo cancelation).

The unit 125 is also that when operating carry out auditory scene analysis (ASA) from the multi-channel audio input and one or more partially pre-processed audio. The ASA is carried out by an auditory scene analyzer 205 that when operating detect and track local sound objects and their relative positions, de-clutter the combination of detected sound objects, and integrate with any auxiliary audio signals to form a de-cluttered local auditory scene (of the captured soundfield) that has a measure of plausibility and perceptual continuity. The detecting and tracking include estimate one or more characteristics of sound objects.

The ASA enables the example endpoint 111 to code the resulting de-cluttered auditory scene to form coded scene data comprising audio (a mono stream) and scene data (remaining data usable in combination with the mono audio) to re-create the local soundfield with any auxiliary input. data to a server 101 or to one or more receiving endpoint. In some embodiments, the coded scene data is combined with rendering instructions to form an endpoint scene dataset. The endpoint scene dataset provides to the server 101 and/or endpoint information to clean and simplify accepted data, including collating objects within the de-cluttered local auditory scene from endpoint 111 and any other auditory scenes received from other capturing endpoints, in order to remove clutter, to produce a combination of coded auditory scenes to send to one or more endpoints for rendering. An end point receiving the combination of coded auditory scenes from the server 101 or directly from one or more capturing endpoints 105, 107, 109, e.g., example endpoint 111, can remove clutter and simplify the audio rendering of the sound objects in an auditory scene of the conference, and output to the display unit 135 signals form a relatively simple visual display of information about the conference on the display unit.

Additionally, the display unit 135 together with the user interface 137 provides capability for a communicant to input and directly interact with the rendered audio and and/or with displayed representations of objects. As a simple but not limiting example, an active object (a sound source) in a rendered auditory scene may be viewed on the display unit 135. The user interface may include a touch sensitive surface, e.g., a capacitive touch sensor over the ribbon display element or elements, such that the communicant making a gesture, e.g., a press and drag, affects the spatial rendering properties, e.g., move the position of that active sound source in the rendered auditory scene.

Similarly, with respect to the auditory scene formed using ASA in a soundfield-capturing endpoint, in some embodiments of the invention, the display and UI processor 119 responsive to a local participant's input, causes suppression of one or more directions of undesirable noise by demoting the directions in the input audio processing of the captured soundfield capture, according to the user input to the UI 137.

The estimation and tracking of objects occurs in what we call near real time using historical data, so that the scene analysis may slightly lag behind the instantaneously captured audio. By using historical data, the estimation and tracking provides a higher certainty of the nature and behavior of objects along with a historical context that is used in an inference engine to create what is a simplified and less cluttered representation of auditory scenes.

By real time is meant signal processing and modification of signals occurring in under 100 milliseconds, e.g., in 20 ms to 30 ms time. Audio information arriving at an endpoint from the network 103 should be rendered to the loudspeaker set 139 or headset 131 within real time, say in less than 100 milliseconds, preferable in 20 ms or so. This is needed to maintain a relatively lower latency for communication in the conference system 100.

By "near real time" is meant processing and generating results within a time interval greater than 100 ms., e.g., between 100 ms and a few, e.g., less than 10 s. In some embodiments, near real time means within 100 ms and 1 second.

Some results of scene analysis and inference by the ASA 205 analyzer are near real time, and determined from data accumulated in real time. Were an auditory scene provided in the first short interval, i.e., in real time, the results would have an undesired amount of clutter because of false positives in identifying the objects.

In one embodiment, the scene analyzer 205 carries out a method comprising estimating the input signal strength, estimating whether the input signal is likely to be a nuisance signal, determining one or more spatial parameters, e.g., the angle, and diffusivity of the sound, and carrying out maximum likelihood classification to recognize potential (or temporary) objects. The audio of such potential objects is output to provide to real time audio data. The method includes accumulating the captured real-time data, including the estimated parameters, determining statistics thereon, e.g., variance measures on the quantities, and uses the statistics and the temporary object information to carry out model-matching to decide whether or not the potential object is matched to the model, and if not, discarding the temporary object. The scene thus inferred in "near real time" by the ASA has a higher confidence level than if classified only in real time, and provides a degree of cleaning, simplification, removal of cluttering and better leveling of loudness of detected sound objects and their properties.

One embodiment of the method of scene analyzer 205 continues to accumulate statistics, and determines one or more ASA data elements in a "historical" time frame of up to seconds or even minutes. For example, shadow areas reflect the longer term distribution of people speaking, in that case in historical context.

We introduce a function now, an auditory scene analysis block that's sent there, which uses a real time or near real time analysis of the audio input so the scene analysis works from the present and historical signals using features derived from the audio signal it performs tracking estimation and inference, a representation internally of a number of objects inferred to be important and composite/component objects within the auditory scene.

Thus, scene analysis includes decision logic and accumulation of statistics for a set of hypothesized objects being tracked. So we have a set of inferred sound sources, which may or may not be active at any time. We have a decision heuristic operating in near real time to decide which objects are presently active and we have the accumulation of historical information on a per-object basis.

Historical accumulation and processing in the ASA may provide indication of the propensity of a particular object in a particular direction to be involved over time, such that a communicant sees a display that includes more than properties of the instantaneous soundfield being rendered or of the soundfield being captured. Thus, in one embodiment, one or more properties of the sound objects are displayed to provide for viewing an auditory scene, including properties that are instantaneous and one or more properties that summarize what has occurred in the recent past period, e.g., recent past seconds.

Scene Modification by a Communicant

The scene analysis performed by the ASA processor 205 provides de-cluttered local auditory scene data usable for rendering the audio at the server 101 and/or remote endpoint. The display and UI processor 119 receive information on de-cluttered auditory scenes captured in \ other endpoints from the server 101 to display on the ribbon display element or elements of display unit 135. In some versions, the display and UI processor 119 also received the de-cluttered cluttered auditory scene.

As described elsewhere herein, the display processor and UI 119 uses color, intensity, size, and/or different characteristics of the display unit to represent objects and their behaviors both in near real time, near real-time, and longer term.

A user interface 137 accepts commands, e.g., gestures on a touch sensitive surface from a local communicant to control the sound objects of the rendered and/or displayed scene. A combiner/modifier 207 is that when operating combine ASA-determined information from the ASA processor 205 with the commands accepted at the user interface 137 to generate parameters for the pre-processor 202 to affect the nature of the pre-processing in response to the combination of the commands and ASA-determined information. The combiner/modifier can affect at least one of the pre-processing, the ASA, the placement of sound object in the captured scene. In the case the endpoint includes a receiving module and the display unit displays remote sound objects in a scene of the conference, the user interface also provides capability for the user to select a remote object and manipulate at least one aspect of the selected object, such as the rendering and/or display of the selected object.

Note that the ASA information combined with the commands created metadata associated with the ASA for rendering. The metadata is used by the display unit 135, and is also coded by coder 211 and sent to remote endpoints, so that the ASA data and command combination is usable at the far end endpoint that has a display unit such as display unit 135 and a display processing element such as that in unit 119 for rendering a summarizing depiction of an auditory scene.

Coding at the Send End

In some embodiments, coder 211 codes the de-cluttered local auditory scene to produce coded scene data in the form a mono audio stream ("audio") and other data ("scene data").

In one embodiment, the coder 211 is that when operating implement a spatially layered audio coding scheme for soundfield representation. Input processor 125 is configured to encode input audio as a spatially layered, encoded audio signal, including at least one monophonic layer and at least one soundfield layer. When decoded, at least one said soundfield layer, together with at least one said monophonic layer, is indicative of a soundfield audio signal. When each soundfield layer is omitted from the spatially layered encoded audio signal, at least one remaining monophonic layer is (when decoded) indicative of a monophonic audio signal, but no remaining monophonic layer is (when decoded) indicative of the soundfield audio signal.

The spatially layered audio coding scheme has multiple layers that, when combined, provide generally increasing levels of soundfield fidelity. In typical implementations the coding scheme includes two or more of the following layers: a (main) mono layer, one or more other audio mono layers that together provide sufficient information to construct a soundfield. The input audio processing and coder accepts a plurality of audio signals decomposes the audio signals, in accordance with decomposition parameters controlling the quantitative properties of an orthogonal energy-compacting transform, into rotated audio signals. In one version of ASA, a time-variable gain profile is determined specifying constructively how the rotated audio signals may be processed to attenuate undesired audio content. The monophonic layer may comprise one of the rotated signals and the gain profile. The soundfield layer may comprise the rotated signals and the decomposition parameters. In one embodiment, the gain profile comprises a cleaning gain profile with the main purpose of eliminating non-speech components and/or noise. The gain profile may also comprise mutually independent broadband gains, e.g., one or more of voice activity detection (VAD) gains, spatial cleaning gains, mono cleaning gains, and levelling gains to ensure the audio is an a uniform level of loudness. Because signals in the audio coding format can be mixed with a limited computational effort, the methods may be advantageously be applied in an audio conferencing application, as described in the present invention. The different gains are combined, coded, and packed into a single gain profile, the rotated audio signal components include a audio component (the mono stream), coded and packed as a single mono stream, the two remaining audio components are combined with metadata indicative of rotation parameters used in the mapping of the captured input audio into orthogonal rotated acop components, and form another element in the layered coded structure, and render parameters providing instructions to a receiving endpoint in rendering the audio are packed and into a rendering coded element in the layered coded structure.

See the section titled "Using known methodologies" for details on layered coding, and on how to select a layer, how to simplify a conference scene, how to combine coded layered constructs, etc.

The Conference Server

For purposes of description, the endpoint 111 sends an endpoint scene dataset comprising coded scene data (mono and scene data) and rendering data. The conference server 101 receives these and other endpoint scene datasets from one or more endpoints. The conference server 101 includes a conferencing manager that when operating decide what audio should be combined in what way for output to an endpoint using the scene data from those endpoints.

The conference server 101's is configured to perform:
- culling, which is essentially dropping one or more particular items of information;
- forwarding by sending coded data combinations (each audio and scene data) from an input endpoint unaltered; and
- mixing, which includes combining audio and scene data from a plurality of endpoints to send to a receiving endpoint.

An important aspect is that the scene data (information from the auditory scene analysis) remains present with the coded combination, i.e., remains present with the stream audio data that's then sent to the rendering endpoints.

In one embodiment, the conference server 101 adds additional rendering metadata to provide an indication of how the endpoint should render the auditory scene as decided by the conference server 101. The combination of the included endpoint scene datasets combination each with rendering metadata, and the server metadata form what we call a multi-scene dataset. The server sends the multi-scene data of endpoint scene datasets and additional rendering data to endpoints, e.g., to endpoint 111 to be used by a receiving endpoint that has a display unit such as display unit 135 and a display processing element such as that in unit 119 to display a summarizing depiction of an auditory scene of the conference, and by rendere 117 to render sound objects via the loudspeaker set 139.

The Receive-side Output Processing of an Example Endpoint

Figure 4:
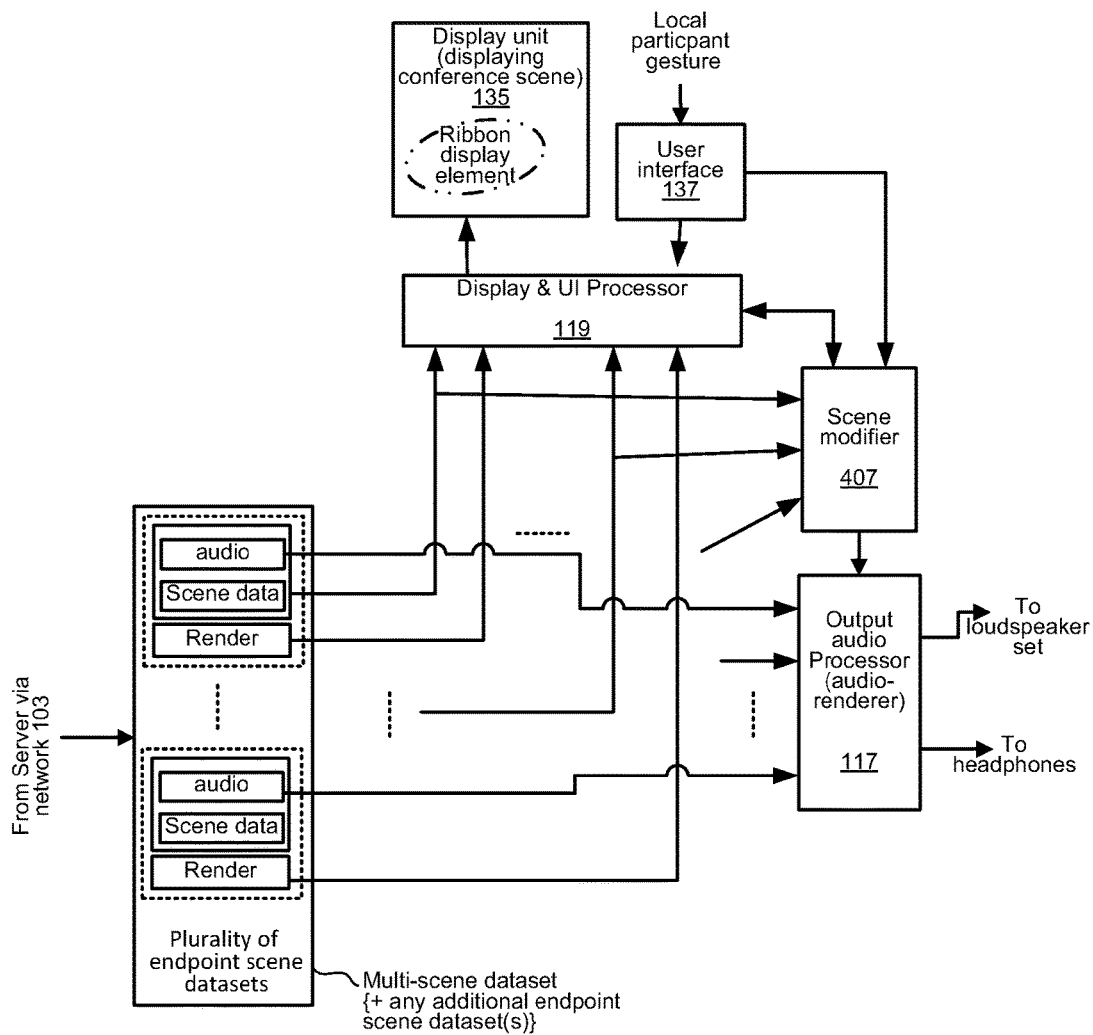
FIG. 4 shows an embodiment of the output processing at an endpoint that includes to features of the present invention.

FIG. 4 shows an embodiment of the output processing of the endpoint 111. A coded combination of coded combinations, i.e. a multi-scene dataset is received from the server 101 and decoded. The display and UI processor is configured to select respective ones of rendering information and/or scene data of selected ones of the endpoint datasets in the multi-scene dataset. A scene modifier 407 is responsive to user input received from a user generating input to the user interface, and interpreted by the display and UI processor 117 in combination with any server rendering data to cause the display unit 135 to display a graphical representation of the state of the conference on a ribbon display for the conference scene.

The display and UI processor 117 in combination with a scene modifier 407 determines how the conference it to be presented, based on remote endpoint and/or server generated scene data and/or rendering metadata. Sound objects are displayed using directional component or extent on the extent of the ribbon element, and may make use of color, intensity, shape, transparency, and so forth.

The user interface in one embodiment is on a touch-sensitive component on the display surface that outputs the location(s) and optionally one or more other properties of a single, or multiple finger touch. The communicant can interact with the objects as displayed and affect change to the way that the scene is rendered. UI-captured commands are interpreted and provides to the scene modifier 407.

The scene modifier 407 provides the final instructions to the output audio processor 117 for rendering selected ones of audio components in the coded combinations. The renderer differs from conventional renders in that the scene modifier is included. The modifier 407 intercepts and changes the rendering instructions through the cycle having displayed on the display unit the combination of scene information and rendering metadata, and learns the context.

In alternate embodiments, some of the scene modifications or parts thereof are carried out by the conference server. Due to efficiency and simplicity considerations, the modifications of scenes that can be carried out in the conference server 101 are restricted to those that can be achieved without having to provide instructions from the endpoint to the conference server. The conference server forwarded the coded combinations, to be modified at the endpoint.

An aspect of the invention is the efficient display of objects at the output using the metadata channel of the endpoint scene datasets and the multi-scene dataset passing through the system. At the point of rendering in the endpoint, there may be streams that comprise multiple channels of capture and transmitted from complex environments or complex soundfields, which themselves have multiple objects within the soundfield. The scene analysis represents the metadata containing a description in the form of object identification, active objects, and object properties that are presently occurring. In this manner, embodiments of the invention do not require scene analysis to be performed at the receiving endpoint. As an example, an endpoint only able to receive a single soundfield would also receive the scene analysis from that soundfield, such that the output display unit would still be able to render a rich but yet simplified and relatively clutter-free visualization of that soundfield activity without requiring additional processing at the remote endpoint. Scene analysis is preferably performed only at the input, where there may be available more audio channels or microphone inputs, and is before the audio signal any degradation through coding.

Clearly the scene analysis data (scene data) can occur at a lower rate than the audio itself. The scene data primarily contains information about the present object. In some versions of the output processing, the output endpoint accumulates ASA statistics to create a longer term scene. However, it is not required to perform the inference and tracking identification of objects that is included in the input side ASA.

In the case of many endpoint scene datasets, some of which contain scene data, such scene data can be used, in addition to spatial multiplexing or the rendering instructions to create a composite scene for the acoustic rendering and appropriately modified in terms of object display on the interface to create a matching display of the soundfield in a conceptualized or schematic form including identified objects and activities.

Some of the details of modifying of the scenes responsive to user commands, e.g., gestures accepted by the UI are described in commonly-owned U.S. Pat. App. No. 62/020702 titled "Auxiliary Augmentation of Soundfields" filed Jul. 3, 2014, the contents of which are incorporated herein by reference. US 62/020702 describes a method for altering an audio signal of interest in a multi-channel soundfield representation of an audio environment. The method includes the steps of: (a) extracting the signal of interest from the soundfield representation; (b) determining a residual soundfield signal; (c) inputting a further associated audio signal, which is associated with the signal of interest; (d) transforming the associated audio signal into a corresponding associated soundfield signal compatible with the residual soundfield; and (e) combining the residual soundfield signal with the associated soundfield signal to produce an output soundfield signal. The method can be used in an embodiment of the present invention for incorporating the auxiliary input into a captured data scene, and for modifying a presented auditory scene in response to one or more gestures accepted by the user interface.

The Display Unit Shape

In embodiments of the present invention, the display device comprises a ribbon display element that has an extent, with different points along the extent being indicative of respective different placement of audio sources. The ribbon has a shape in extent.

As an example, a desktop endpoint device in a top view (the plan view) has an outer shape. In one set of embodiments, the shape of the extent of the ribbon display is similar to the shape of the convex hull of the device's outer shape. Similarity is used here in the geometric sense that the shape is the same, but the size is not required to be the same. In such embodiments, the shape is smaller than the convex hull to that the banded display can be accommodated on the surface of the desktop endpoint device.

In other embodiments, the ribbon display element is annulus-shaped. In another embodiment, the ribbon display element is oval-shaped (egg-shaped or ellipse-shaped). Other possible shapes include a stadium shaped ribbon display element, a C-shaped ribbon display, and so forth.

FIGS. 6A-6K show plan views of desktop device of a variety of shapes, and of the shape of ribbon display element that can be used in embodiments of the invention.

Note that, while not shown, a ribbon display element does not need to, and in some embodiments does not follow the whole closed curve defining its shape, but has a gap, to form, e.g., in the case of a circular or oval shape, a C-shaped element.

A Table-top Conferencing Device

Also provided by embodiments of the invention is a table-top conferencing device comprising: an input audio processor and coder 125 to clean, beamform, extract the soundfields where the desired content and context exists by carrying out pre-processing and auditory scene analysis, and code the result to send to other endpoints, a decoder to decode received streams, an output audio processor 117 to render the sound objects to a loudspeaker set to accept disparate audio streams or multichannel audio streams and present them effectively in a spatial way, a display and UI processor 119 coupled to a user interface and to a display unit 135 that includes one or more ribbon display elements each having a width, an extent arranged to form a shape. Examples of include annulus-, oval-, and C-shaped extents. Different points along the extent represent audio coming from different directions extending from that device out and encompassing the room. The user interface accepts user input to manipulate the rendered soundfield, to manipulate the manner in which different sound objects are displayed, and to affect processing locally, at a server and/or at a remote endpoint.

Figure 5A:
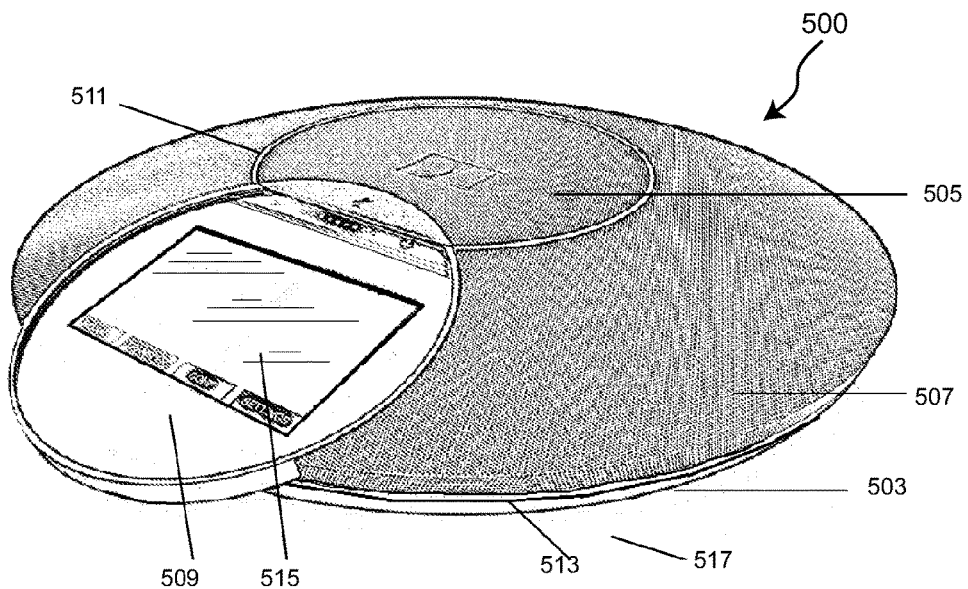
FIGS. 5A and 5B show a perspective views of an example desktop device that include an annular-shaped display and a user interface that includes an embodiment of the present invention.
Figure 5B:
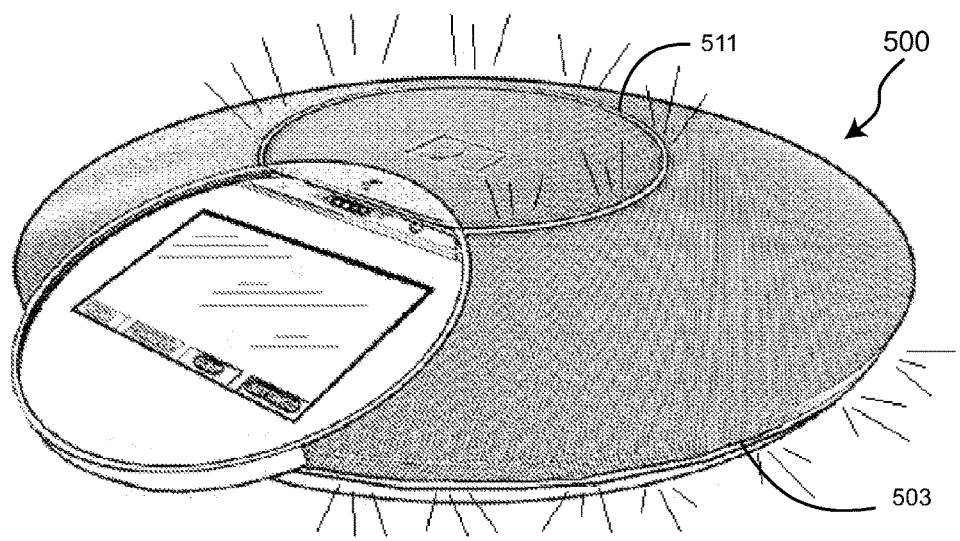
Figure 6A:
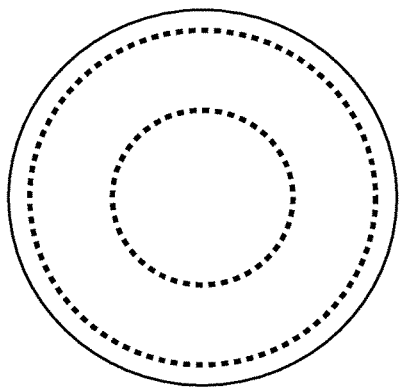
FIGS. 6A-6K show plan views of desktop device of a variety of shapes, and of annular displays of a variety of shapes.
Figure 6B:
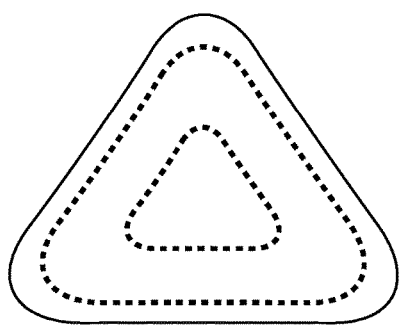
Figure 6C:
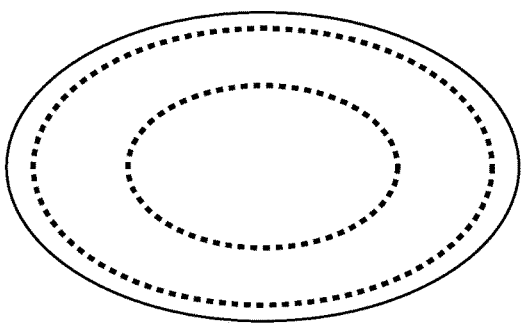
Figure 6D:
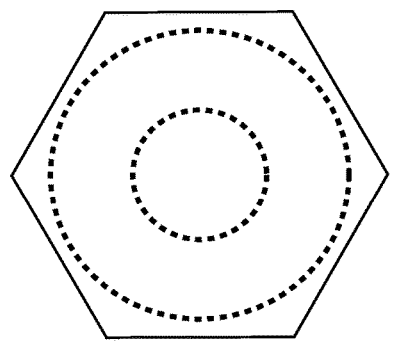
Figure 6E:
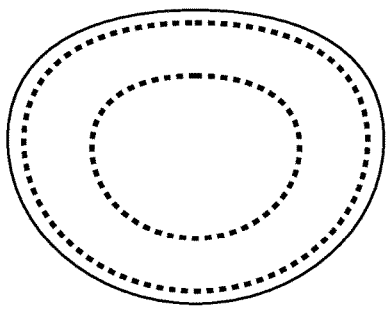
Figure 6F:
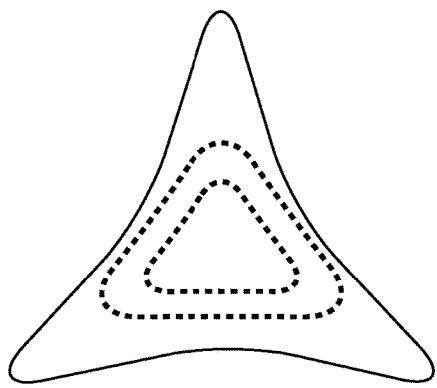
Figure 6G:
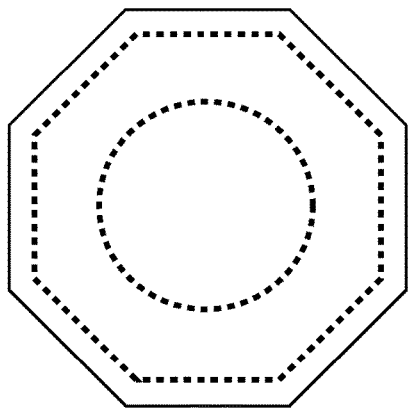
Figure 6H:
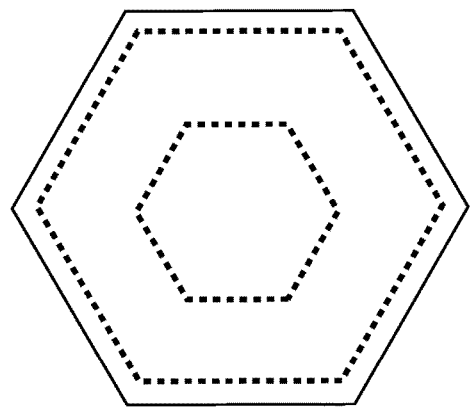
Figure 6I:
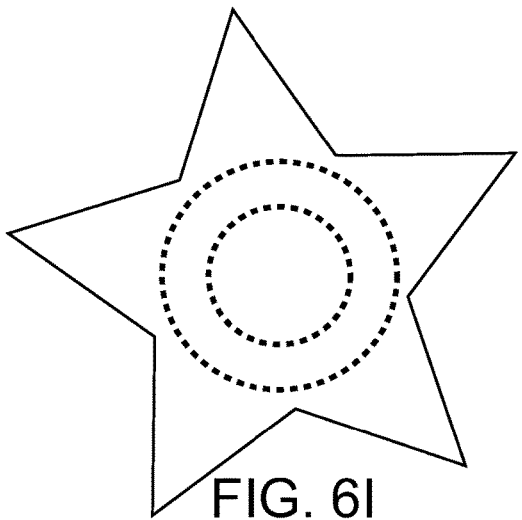
Figure 6J:
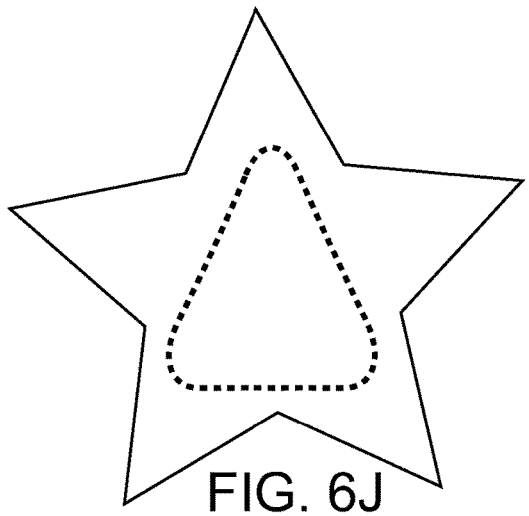
Figure 6K:
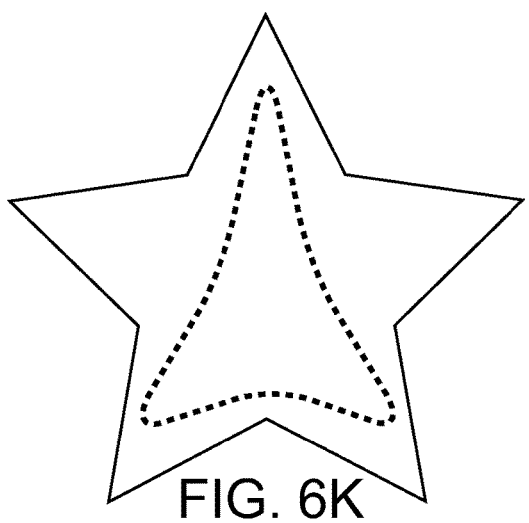
Figure 7:
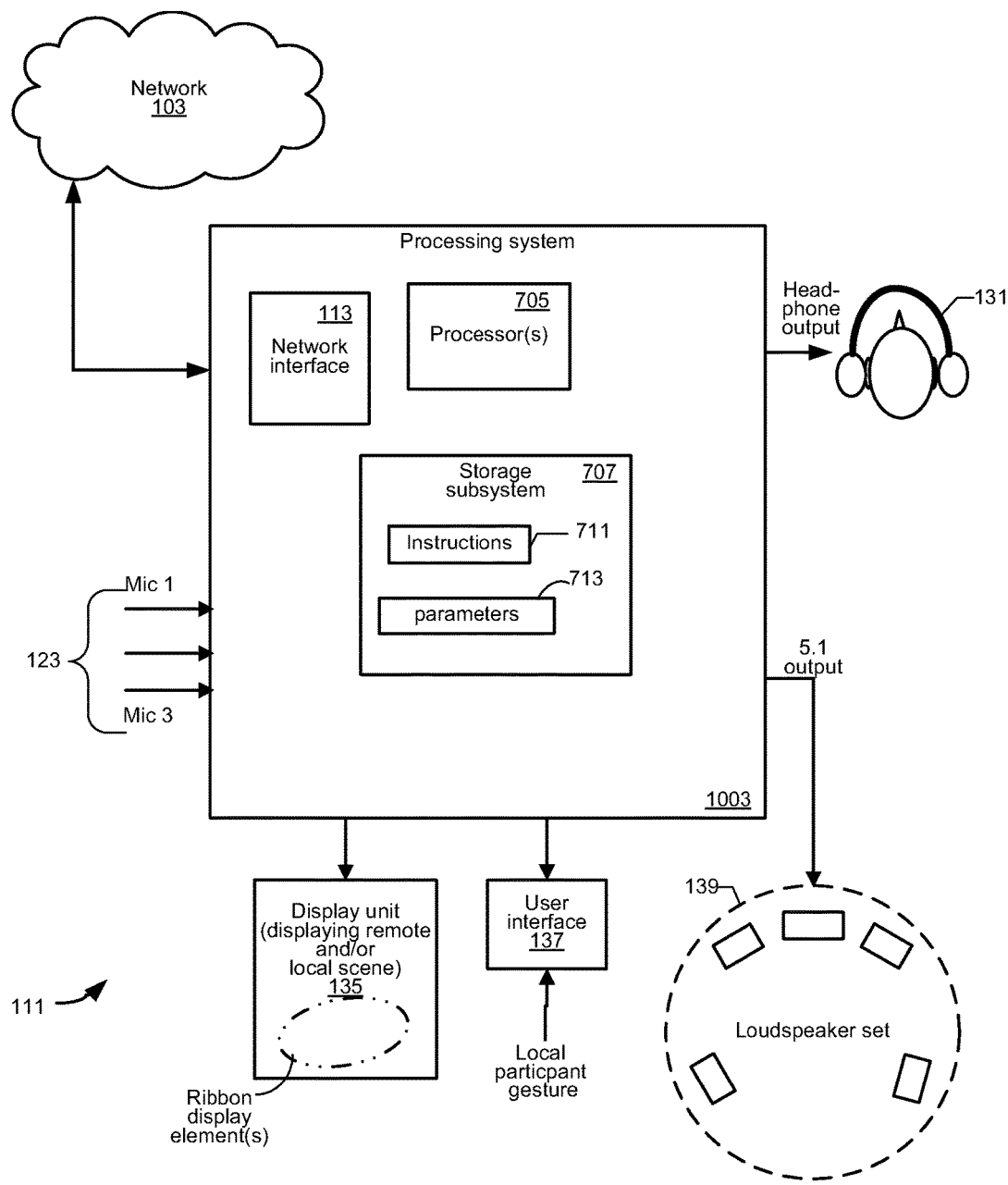
FIG. 7 shows a simplified block diagram of one embodiment of the endpoint processor of FIG. 1 that, in this version, includes a processing system.

Referring now to FIGS. 5A and 5B, there is illustrated a desktop telecommunications device 500 that includes an embodiment of the invention, in particular, an embodiment of endpoint 111. The device 500 comprises a base part 503, a cap part 505, a body part 507, a control panel 509 acting as the UI 137, an upper ribbon display ring 511 and a lower ribbon display ring 513 forming the display unit 135. The body part 507 and the cap part 505 cover the sound microphones and the loudspeakers to ensure that the microphone array 123 and the loudspeaker set 139, respectively, so that they are not visible to a use (a local communicant).

The base part 503 is suitable for resting on a support surface 517 such as a meeting room table. The cap part 505 is located spaced apart from the support surface 517. As illustrated in FIG. 5A, the cap part 505 faces upwardly away from the support surface 517. The body part 507 and the cap part 505 include a plurality of apertures extending therethrough to facilitate sound transmission therethrough. The body part 507 and the cap part 505 may be of any suitable material, for example of metal mesh, or some other material that is relatively transparent to sound.

As illustrated in FIG. 5A, the control panel 509 is inclined relative to the plane of the support surface 517 and relative to the plane of the base part 503. The control panel 509 includes a touchscreen element 515 to control operation responsive to a user touching part of the touchscreen element 515.

While in one version, control of the auditory scene and other control is via the touchscreen element 515. In another version, the touch sensitive area of the UI is not limited to the screen, so that a user may touch anywhere on the device 500 not just the screen. As an example, a touch on the body part 507 may be used to indicate the position of the talker relative to the device 500. This may inform the audio rendering engine of the physical location of the talkers without having to estimate it when they talk. The auditory scene may be rendered for remote communicants in that location or a synthetic location derived therefrom. Dragging a finger around the surface of the body part 507 on the device may be used to rotate the auditory scene.

The upper ribbon display ring 511 is located between the cap part 505 and the body part 507. The lower ribbon display ring 513 is located between the body part 507 and the base part 503. Each of the ribbon display rings 8, 9 extends along part of the external surface of the device 500 in a curved ring shape. Each of the ribbon display rings 511, 513 extends in a plane parallel to the plane of a support surface 517 and parallel to the plane of the base part 503. Each of the ribbon display rings 511, 513 comprises a tubular element.

When the device 500 is in an active state in which the device 500 is capable of capturing sound and/or rendering sound, each of the ribbon display rings 511, 513 emits light to indicate the active state of the device 500. When the device 500 is in an inactive state in which the device 500 is incapable of capturing sound and/or rendering sound, each of the ribbon display rings 511, 513 is turned off and does not emit light to indicate the inactive state of the device 500.

FIG. 5A illustrates the telecommunications device 500 having the touch screen 515 with the top and bottom mounted ribbon display rings 511, 513 turned off. FIG. 5B illustrates the telecommunications device 500 having the touch screen 515 with the top and bottom mounted ribbon display rings 511, 513 activated, and displaying different aspects of the conference as described herein.

Alternate Embodiments

It will further be appreciated that the lighting means to indicate the active state of the device may be provided in a variety of different manners. For example the light rings may be provided in the form of single multi-colored LEDs around the device to indicate talk status, auditory scene information, device status and the like. Alternatively precision lighting element may be used for the light guide. Alternatively a ring of light similar to a halo may be used to provide a continuous circle of information. The entire circle may be illuminated in the same colorcolor, for example blue used for a spatial call, green used for a standard phone call, red used for muted indication, blue flashing when ringing and the like. Alternatively, one ring of light may be placed around the top edge between the main side panel and the lip of the dish.

Another ring of light may be placed around the bottom of the device. A third ring of light may be placed around the control pad. Each ring may be in different colors and communicate different information. They may be used simultaneously. For example a blue ring on top for a spatial call, with a blue pulsing ring underneath to communicate call quality, with a red flashing ring around the control pad to indicate when someone is requesting a private call.

Thus, the display unit displays representations of conference communicants on the one or more ribbon display elements, with the representations of at least two communicants being different, and wherein the representations are chosen from the group consisting of {shapes, colors, lines, animations}.

In some embodiments, the representations of at least two communicants are displayed at locations of a virtual meeting room.

Some embodiments include an auditory scene control mechanism operable during the conference to provide capability for a communicant to modify the display and/or rendering of sound objects. In one such embodiment, at least one representation of the at least one communicant can be activated to cause a selected processing operation to be applied to the corresponding at least one communicant such as audio muting, designating the at least one communicant a dominant talker, applying an audio processing function to an audio stream related to such at least one communicant, initiating a private communication with at least one other communicant, assigning a new auditory scene position or changing an audio volume.

At least some displayed representations may be of different size and/or different brightness and/or different color on the one or more ribbon display elements.

In some embodiments, the representations are grouped according to at least one characteristic which is common to at least two of the communicants, such as location, an activity measure, an importance measure, usage of a specific device for an endpoint.

In some embodiments, each representation relates to a category to which the corresponding communicant belongs. In some such embodiments, the conferencing system is configured to spatially render the audio of at least one communicant based on the respective communicant category.

In some embodiments, conference-related information is displayed, and includes at least one of network connectivity, dial-in device status, acquired audio signal strength, noise floor measure, nuisance measure, conference server status, current audio rendering position indicator, endpoint device used, talking direction, activity detection, audio mixing strategy indicator, statistics, conference equipment used, portion of participation activity of at least one communicant relative to at least one further communicant, and sensor and/or system information. The conference-related information may be placed in proximity of the respective communicant who relates to such information.

In some embodiments, the display processor is that when operating maintain the displayed representation of at least one communicant at the same display position upon said communicant changing his endpoint device during the conference.

In some embodiments, a meeting template is pre-populated with display positions, such that at least some representations are displayed at the respective display positions upon respective communicants' joining the conference.

Some endpoint embodiments include a memory for saving at least one display position of at least one representation for retrieval and display in a subsequent conference.

Some endpoint embodiments include an auditory scene placement memory, and wherein the output processor is that when operating store auditory placements of at least some communicants in an auditory scene of a conference. The stored placements may be selected by a communicant of an endpoint.

In some embodiments, the output processor is that when operating store a plurality of user-related placements in the auditory scene placement memory and to compute at least one preferred auditory scene from the plurality of user-related placements.

Some endpoint embodiments include an activity indicator for displaying voice activity of at least one endpoint microphone. The displaying the voice activity may include information on a signal strength related to the conference endpoint microphone. In some embodiments, the activity indicator displays the voice activity in relation to a talking direction.

Embodiments of the invention include a non-transitory computer-readable medium containing instructions that when executed by one or more processors in a device, cause the device to carry out any method described herein.

Embodiments of the invention include a device for operating in a communication system, the device comprising a non-transitory storage device and at least one processor, the storage device containing instructions that when executed, cause the device to carry out any method described herein.

In some such embodiments, the device includes programmable memory containing firmware that customize the device, and wherein at least a subset of the instructions are included in the firmware.

Using Known Methodologies

The following commonly-owned published patent applications provide more details of some of the methods and processing of some of the elements described hereinabove. The methodologies described in these publications may be used, after suitable modification, in some embodiments of the present invention. Each of the following published International Patent Applications designates the U.S.A. The contents of each of the following International Patent Applications are incorporated herein by reference in their entirety.

Commonly-owned International Patent Publication WO 2014099809 titled AUDIO BURST COLLISION RESOLUTION published 26 Jun. 2014 describes a method for mitigating the effects of substantially concurrent audio bursts from two or more of participants of an audio conference including identifying a priority attribute associated with each of multiple substantially concurrent audio bursts, comparing the identified priority attributes, and electronically suppressing at least one audio burst.

Commonly-owned International Patent Publication WO 2014085050 titled TELECONFERENCING USING MONOPHONIC AUDIO MIXED WITH POSITIONAL METADATA and published 5 Jun. 2014 describes a method that may be used in input processing and/or a server embodiments of the inventive conference system 100 for preparing monophonic audio for transmission to a node of the system, including steps of generating a monophonic mixed audio signal, including by a mixing a metadata signal (e.g., a tone) with monophonic audio indicative of speech by a currently dominant participant in a teleconference, and encoding the mixed audio signal for transmission, where the metadata signal is indicative of an apparent source position for the currently dominant conference participant. Other embodiments include steps of decoding such a transmitted encoded signal to determine the monophonic mixed audio signal, identifying the metadata signal, and determining the apparent source position corresponding to the currently dominant participant from the metadata signal.

Commonly-owned International Patent Publication WO/2014/062389 titled A TELECOMMUNICATIONS DEVICE and published 24 Apr. 2014 describes a telecommunications device that comprises a base part, a cap part, a body part, a control panel, an upper light ring, a lower light ring, a plurality of sound microphones and a plurality of loudspeakers. The cap part is concave in shape. The body part is frusto-conical in shape and tapers outwardly away from the cap part towards the base part. The body part and the cap part cover the sound microphones and the loudspeakers. The control panel is inclined relative to the plane of the support surface and relative to the plane of the base part. The control panel protrudes upwardly from the upper edge of the body part over the concave cap part, and the control panel protrudes downwardly from the lower edge of the body part. The control panel controls operation of the sound microphones and the loudspeakers. The upper light ring is located between the cap part and the body part. The lower light ring is located between the body part and the base part. When the device is in an active state in which the device is capable of capturing sound and/or rendering sound, each of the light rings emits light to indicate the active state of the device. Such a device can be modified to accommodate the inventive combination of components of an endpoint embodiment of the present invention.

Commonly-owned International Patent Publication WO 2014052429 titled SPATIAL MULTIPLEXING IN A SOUNDFIELD TELECONFERENCING SYSTEM and published 3 Apr. 2014 described mapping of soundfields within an audio conference system such as system 100 of FIG. 1 of the present disclosure. A conference multiplexer configured to place a first input soundfield signal originating from a first soundfield-capturing endpoint, e.g., endpoint 111 within a 2D or 3D conference scene to be rendered to a listening participant is described. The first input audio signal is indicative of a soundfield captured by the first soundfield-capturing endpoint. The conference multiplexer is configured to set up the conference scene comprising a plurality of active participants' locations at different angles with respect to the listener; to provide a first sector that has a first angular width greater than zero; and to transform the first input soundfield signal into a first output soundfield signal, such that for the listener, the first output soundfield signal appears to be emanating from one or more virtual communicant locations within the first sector.

Commonly-owned International Patent Publication WO 2014052431 titled METHOD FOR IMPROVING PERCEPTUAL CONTINUITY IN A SPATIAL TELECONFERENCING SYSTEM published 3 Apr. 2014 describes improving the perceptual continuity within an audio conference system. The methodology described in the publication can be used in the server 101, on in the case of peer-to-peer communication, in a receiving endpoint of inventive conference system 100. According to an aspect, a method for multiplexing first and second continuous input audio signals generated by a first and second endpoint is described that is operative to generate a multiplexed output audio signal which is to be rendered to a listener. The first and second endpoints generate the first and second input audio signals in a layered coding format encoding a first and second auditory scene, using layered coding that includes a monophonic layer and at least one soundfield layer. The method comprises determining a talk activity in the first and second input audio signals, respectively; and determining the multiplexed output audio signal based on the first and/or second input audio signals and subject to one or more multiplexing conditions. The one or more multiplexing conditions comprise: at a time instant, when there is talk activity in the first input audio signal, determining the multiplexed output audio signal at least based on the first input audio signal; at a time instant, when there is talk activity in the second input audio signal, determining the multiplexed output audio signal at least based on the second input audio signal; and at a silence time instant, when there is no talk activity in the first and in the second input audio signals, determining the multiplexed output audio signal based on only one of the first and second input audio signals. The methodology described in the publication can be used in the server 101, on in the case of peer-to-peer communication, in a receiving endpoint of inventive conference system 100.

Commonly-owned International Patent Publication WO 2014046923 titled AUDIO CODING WITH GAIN PROFILE EXTRACTION AND TRANSMISSION FOR SPEECH ENHANCEMENT AT THE DECODER published 27 Mar. 2014 describes a layered audio coding format with a monophonic layer and at least one soundfield layer. A method is described suitable for carrying out some of the input audio processing and coding 125 of an inventive endpoint 111 of the present invention. In the method, a plurality of audio signals is decomposed, in accordance with decomposition parameters controlling the quantitative properties of an orthogonal energy-compacting transform, into rotated audio signals. Further, a time-variable gain profile specifying constructively how the rotated audio signals may be processed to attenuate undesired audio content is derived. The monophonic layer may comprise one of the rotated signals and the gain profile. The soundfield layer may comprise the rotated signals and the decomposition parameters. In one embodiment, the gain profile comprises a cleaning gain profile with the main purpose of eliminating non-speech components and/or noise. The gain profile may also comprise mutually independent broadband gains. Because signals in the audio coding format can be mixed with a limited computational effort, the methods may be advantageously be applied in an audio conferencing application, as described in the present invention.

Commonly-owned International Patent Publication WO 2014046944 titled METHODS AND SYSTEMS FOR SELECTING LAYERS OF ENCODED AUDIO SIGNALS FOR TELECONFERENCING published 27 Mar. 2014 describes a method for selecting at least one layer of a spatially layered, encoded audio signal that occurs in an audio conference, such as described in the inventive conference system 100. Typical embodiments are teleconferencing methods in which at least one of a set of nodes (endpoints, each of which is a telephone system, and optionally also a server) is configured to perform audio coding in response to soundfield audio data to generate spatially layered encoded audio including any of a number of different subsets of a set of layers, the set of layers including at least one monophonic layer, at least one soundfield layer, and optionally also at least one metadata layer comprising metadata indicative of at least one processing operation to be performed on the encoded audio. Other aspects describer include systems configured (e.g., programmed) to perform any embodiment of the selecting method, and non-transitory computer-readable media which store code for implementing any embodiment of the method or steps thereof.

Commonly-owned International Patent Publication WO 2014046916 titled LAYERED APPROACH TO SPATIAL AUDIO CODING published 27 Mar. 2014 describes a layered audio coding format with a monophonic layer and at least one soundfield layer that can be used in the present invention. A method is described suitable for carrying out some of the input audio processing and coding of an inventive endpoint 111 of the present invention. A plurality of audio signals is decomposed, in accordance with decomposition parameters controlling the quantitative properties of an orthogonal energy-compacting transform, into rotated audio signals. Further, a time-variable gain profile specifying constructively how the rotated audio signals may be processed to attenuate undesired audio content is derived. The monophonic layer may comprise one of the rotated signals and the gain profile. The soundfield layer may comprise the rotated signals and the decomposition parameters. In one embodiment, the gain profile comprises a cleaning gain profile with the main purpose of eliminating non-speech components and/or noise. The gain profile may also com-prise mutually independent broadband gains. Signals in the audio coding format can be mixed with a limited computational effort. The described method may advantageously be applied to the conferencing system 100 described herein.

Commonly-owned International Patent Publication WO 2014046941 titled METHOD AND SYSTEM FOR OBJECT-DEPENDENT ADJUSTMENT OF LEVELS OF AUDIO OBJECTS published 27 Mar. 2014 describes a method for adaptive control of gain applied to an audio signal. Such a method can be included in the auditory scene analyzer of the input audio processor and coder 125 of the present invention. The disclosure includes steps of analyzing segments of the signal to identify audio objects, e.g., voices of participants in a voice conference; and storing information regarding each distinct identified audio object. WO 2014046941 includes using at least some of the stored information to determine at least one of a target gain, or a gain change rate for reaching a target gain, for each identified sound object; and applying gain to segments of the signal indicative of an identified sound object such that the gain changes, typically, at the gain change rate for the object, from an initial gain to the target gain for the object. The information stored may include a description of the auditory scene that includes the sound objects.

Commonly-owned International Patent Publication WO 2014043024 titled LONG TERM MONITORING OF TRANSMISSION AND VOICE ACTIVITY PATTERNS FOR REGULATING GAIN CONTROL published 20 Mar. 2014 relates to the control of the level of audio signals within audio communication systems, and is usable in the inventive audio conferencing system 100 that includes embodiments of the present invention. In particular, WO 2014043024 describes how to carry out near-real-time scene analysis to perform the noise and clutter removal use in embodiments of the present invention to form a simplified scene for output on the display unit, and additionally how to carry out longer-than-near-real-time scene analysis to create information to display on the display unit, including such heuristics as, for example, the transitions between sound objects (the communicants) and turn taking between sound objects (the communicants). The near-end audio signal comprises a sequence of segments, including a current segment and one or more preceding segments. The method comprises determining a nuisance measure which is indicative of an amount of aberrant voice activity within the sequence of segments of the near-end audio signal; and determining the leveling gain for the current segment of the near-end audio signal, at least based on the leveling gain for the one or more preceding segments of the near-end audio signal, and by taking into account, according to a variable degree, an estimate of the level of the current segment of the near-end audio signal; wherein the variable degree is dependent on the nuisance measure.

Commonly-owned International Patent Publication WO 2013142659 titled METHOD AND SYSTEM FOR SIGNAL TRANSMISSION CONTROL and published 26 Sep. 2013 describes methods usable in the auditory sound analyzer of the input audio processor and code 125 of endpoint 101 for determining in near real time, and longer than real near time characteristics of features in a received or accessed audio signal comprising a temporal sequence of frames (blocks). Features are determined as characterizing aggregately the sequential audio blocks/frames that have been processed recently, relative to current time. The feature determination exceeds a specificity criterion and is delayed, relative to the recently processed audio blocks/frames. Voice activity indication is detected in the audio signal. Voice activity detection (VAD) is based on a decision that exceeds a preset sensitivity threshold and is computed over a brief time period, similar to the to frames duration, and relates to current block/frame features. The VAD and the recent feature determination are combined with state related information, which is based on a history of previous feature determinations that are compiled from multiple features, determined over a time prior to the recent feature determination time period. Decisions to commence or terminate the audio signal, or related gains, are outputted based on the combination.

Commonly-owned International Patent Publication WO 2013142657 titled SYSTEM AND METHOD OF SPEAKER CLUSTER DESIGN AND RENDERING and published 26 Sep. 2013 describes a method of outputting audio in a teleconferencing environment that may be applied in an embodiment of endpoint 111. The method includes receiving audio streams, processing the audio streams according to information regarding effective spatial positions, and outputting, by at least three loudspeakers arranged in more than one dimension, the audio streams having been processed. The information regarding the plurality of effective spatial positions corresponds to a perceived spatial scene that extends beyond the loudspeakers in at least two dimensions. In this manner, communicants in the teleconference perceive the audio from the remote communicants as originating at different positions in the teleconference room.

Commonly-owned International Patent Publication WO 2013142731 titled SCHEMES FOR EMPHASIZING TALKERS IN A 2D OR 3D CONFERENCE SCENE and published 26 Sep. 2013 describes methods and systems for setting up and managing two-dimensional or three-dimensional scenes for audio conferences. A conference controller such as server 101 is configured to place a plurality of upstream audio signals associated with a plurality of conference communicants within a 2D or 3D conference scene to be rendered to a listening communicant. The conference controller is configured to set up a X-point conference scene with X different spatial talker locations within the conference scene; assign the plurality of upstream audio signals to respective ones of the talker locations; determine a degree of activity of the plurality of upstream audio signals; determine a dominant one of the plurality of upstream audio signals; and emphasize the dominant upstream audio signal.

Commonly-owned International Patent Publication WO 2013142727 titled TALKER COLLISIONS IN AN AUDITORY SCENE and published 26 Sep. 2013 describes detecting a signal interval in which there is a talker collision between at least a first and a second voice signal of a plurality of received voice signals. A processor receives a positive detection result and processes, in response to this, at least one of the voice signals with the aim of making it perceptually distinguishable. A mixer mixes the voice signals to supply an output signal, wherein the processed signal(s) replaces the corresponding received signals. In example embodiments, signal content is shifted away from the talker collision in frequency or in time. The invention may be useful in a conferencing system such as conference system 100, and aspects can be practiced by at the server 100 and/or at an endpoint.

Commonly-owned International Patent Publication WO 2013142641 titled PLACEMENT OF SOUND SIGNALS IN A 2D OR 3D AUDIO CONFERENCE and published 26 Sep. 2013 describes a conference controller such as server 100 configured to place an upstream audio signal associated with a conference communicant and a sound signal within a 2D or 3D conference scene to be rendered to a listener. The conference controller is configured to set up a X-point conference scene with X different spatial talker locations within the conference scene, X being an integer, X>0; assign the upstream audio signal to one of the talker locations (212); place a sound signal at a spatial sound location within the X-point conference scene; and generate metadata identifying the assigned talker location and the spatial sound location and enabling an audio processing unit to generate a spatialized audio signal based on a set of downstream audio signals comprising the upstream audio signal and the sound signal. The method can be practiced by at the server and/or at an endpoint.

Commonly-owned International Patent Publication WO 2013142642 titled CLUSTERING OF AUDIO STREAMS IN A 2D/3D CONFERENCE SCENE and published 26 Sep. 2013 describes methods and systems for setting up and managing two-dimensional or three-dimensional scenes for audio conferences. A conference controller such as server 101 is configured to place L upstream audio signals within a 2D or 3D conference scene to be rendered to a listener. The conference controller is configured to set up a X-point conference scene; assign L upstream audio signals (to X talker locations; determine a maximum number N of downstream audio signals to be transmitted to the listener's endpoint, determine N downstream audio signals from the L assigned upstream audio signals; determine N updated talker locations for the N downstream audio signals; and generate metadata identifying the updated talker locations and enabling an audio processing unit to generate a spatialized audio signal. The method can be practiced at the server and/or at an endpoint.

Commonly-owned International Patent Publication WO 2013142668 titled—PLACEMENT OF TALKERS IN 2D OR 3D CONFERENCE SCENE, and published 26 Sep. 2013 describes setting up and managing two-dimensional or three-dimensional scenes for audio conferences. A conference controller such as server 101 is configured to place an upstream audio signal associated with a conference participant within a 2D or 3D conference scene to be rendered to a listener at a listener's endpoint. An X-point conference scene with X different spatial talker locations is set up within the conference scene, wherein the X talker locations are positioned within a cone around a midline in front of a head of the listening communicant. A generatrix of the cone and the midline form an angle which is smaller than or equal to a pre-determined maximum cone angle. The upstream audio signal is assigned to one of the talker locations and metadata identifying the assigned talker location are generated, thus enabling a spatialized audio signal. The method can be practiced by at the server and/or at an endpoint.

Commonly-owned International Patent Publication WO 2012109384 titled COMBINED SUPPRESSION OF NOISE AND OUT-OF-LOCATION SIGNALS published 15 Aug. 2012 describes a method that processes: (a) a plurality of input signals, e.g., signals from a plurality of spatially separated microphones; and, for echo suppression, (b) one or more reference signals, e.g., signals from or to be rendered by one or more loudspeakers and that can cause echoes. The method processes the input signals and one or more reference signals to carry out in an integrated manner simultaneous noise suppression and out-of-location signal suppression, and in some versions, echo suppression. This is applicable to pre-processing and processing in the input audio processor and coder of an endpoint embodiment of the present invention.

On Notation, Nomenclature and Other Aspects

Throughout this disclosure, including in the claims, the terms "speech" and "voice" are used interchangeably in a broad sense to denote audio content perceived as a form of communication by a human being, or a signal (or data) indicative of such audio content. Thus, speech determined or indicated by an audio signal may be audio content of the signal which is perceived as a human utterance upon reproduction of the signal by a loudspeaker (or other sound-emitting transducer).

Throughout this disclosure, including in the claims, the term "noise" is used in a broad sense to denote audio content other than speech, or a signal (or data) indicative of such audio content (but not indicative of a significant level of speech). Thus, noise determined or indicated by an audio signal captured during a teleconference (or by data indicative of samples of such a signal) may be audio content of the signal which is not perceived as a human utterance upon reproduction of the signal by a loudspeaker (or other sound-emitting transducer).

Throughout this disclosure, including in the claims, a "loudspeaker" is used synonymously to denote any sound-emitting transducer (or set of transducers) driven by a single loudspeaker feed. A typical set of headphones includes two loudspeakers. A loudspeaker may be implemented to include multiple transducers (e.g., a woofer and a tweeter), all driven by a single, common loudspeaker feed (the loudspeaker feed may undergo different processing in different circuitry branches coupled to the different transducers).

Throughout this disclosure, including in the claims, each of the expressions "monophonic audio," "monophonic audio signal," "mono audio," and "mono audio signal," denotes an audio signal capable of being rendered to generate a single loudspeaker feed for driving a single loudspeaker to emit sound perceivable by a listener as emanating from one or more sources, but not to emit sound perceivable by a listener as originating at an apparent source location (or two or more apparent source locations) distinct from the loudspeaker's actual location.

Throughout this disclosure, including in the claims, the expression "performing an operation on a signal or data" or the like (e.g., filtering, scaling, transforming, or applying gain to the signal or data) is used in a broad sense to denote performing the operation directly on the signal or data in the same, e.g., a time- or a transform-domain, or in a different, e.g., a transform- or a time-domain, or on a processed version of the signal or data, e.g., on a version of the signal that has undergone preliminary filtering or pre-processing prior to the performance of the operation thereon.

Throughout this disclosure including in the claims, the expression "system" is used in a broad sense to denote an apparatus, unit, device, system, subsystem, module, or stage of an apparatus. For example, a subsystem that implements a decoder may be referred to as a decoder system or decoder unit, and a system including such a subsystem, e.g., a system that generates a number of output signals in response to multiple inputs, in which the subsystem generates some of the inputs and the other inputs are received from an external source, may also be referred to as a decoder system or decoder unit.

In a similar manner, the term "processor" may refer to any device or portion of a device that performs operations on electronic data, e.g., from registers and/or memory, to transform that electronic data into other electronic data that, e.g., may be stored in registers and/or memory. In particular, a processor is used in a broad sense to denote a system or device programmable or otherwise configurable, e.g., with software or firmware, to perform operations on data such as audio, video or other image data, or combination of audio and video. A processor may include one or more of a field-programmable gate array or other configurable integrated circuit or chip set, a digital signal processor (DSP) programmable and/or otherwise configurable to perform processing, e.g., pipelined processing on data, e.g., audio or other sound data, a graphics processing unit (GPU), a central processing unit (CPU) of a programmable general purpose processor or computer, and a programmable microprocessor chip, portion of a chip, or chip set.

Note that when a method is described that includes several elements, e.g., several steps, no ordering of such elements, e.g., of such steps, is implied, unless specifically stated.

The phrase "configured to" carry out a step is used synonymously with the phrase "operable to" carry out the step, and means that the elements are designed to carry out the step when operating.

The methodologies described are, in some embodiments, performable by one or more processors that accept logic, e.g., instructions encoded on one or more computer-readable media. When executed by one or more of the processors, the instructions cause carrying out of at least one of the method steps described herein.

A processing system or computer or a computing machine or a computing platform (in general, a processing system) may include one or more processors. A processing system further includes a storage unit with at least one storage medium, which may include memory embedded in a semiconductor device, or a separate memory unit including main random access memory (RAM) in the form of dynamic RAM and/or static RAM, read only memory (ROM), and/or also cache memory. The storage unit may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, or a display unit of a user interface, such a display may be included, e.g., a liquid crystal display (LCD), organic light emitting display (OLED), LED display, plasma display. If manual data entry is required, the processing system also includes an input device such as one or more of an alphanumeric input unit such as a keyboard, a pointing control device such as a mouse, and so forth. The terms "storage device," "storage unit" or "memory unit" as used herein, if clear from the context and unless explicitly stated otherwise, also encompass a storage system such as a disk drive unit. The processing system in some configurations may include a sound input transducer, such as one or more microphones, a sound output device, and a network interface device.

In some embodiments, a non-transitory computer-readable medium is configured with, e.g., encoded with, instructions, e.g., logic, that when executed by one or more processors of a processing system that includes at least one processor element and a storage unit, cause carrying out a method as described herein. Some embodiments are in the form of the logic itself.

A non-transitory computer-readable medium is any computer-readable medium that is statutory subject matter under the patent laws applicable to this disclosure, including Section 101 of Title 35 of the United States Code. A non-transitory computer-readable medium is, for example, any computer-readable medium that is not specifically a transitory propagated signal or a transitory carrier wave or some other transitory transmission medium. The term non-transitory computer-readable medium thus covers any tangible computer-readable storage medium. Such media may take many forms including, for example, random access memory ("RAM", "static RAM"), dynamic memory ("dynamic RAM") such as main memory in a processing system, optical disks, magnetic disks, and magneto-optical disks.

In a typical processing system as described above, the storage unit thus includes a computer-readable storage medium that is configured with, e.g., encoded with, instructions, e.g., logic, e.g., software, that when executed by one or more processors, causes carrying out one or more of the method steps described herein. The software may reside in the hard disk, or may also reside, completely or at least partially, within the memory, e.g., RAM and/or within the processor registers during the execution thereof by the computer system. Thus, the memory and the processor registers also constitute a non-transitory computer-readable medium on which can be encoded instructions to cause, when executed, carrying out method steps.

While the computer-readable medium may be shown in an example embodiment to be a single medium, the term medium should be taken to include a single medium or multiple media (e.g., several memories, a centralized or distributed database, and/or associated caches and servers) that store one or more sets of instructions.

Furthermore, a non-transitory computer-readable medium, e.g., a computer-readable storage medium may form a computer program product, or be included in a computer program product.

In alternative embodiments, one or more processors operate as a stand-alone device, or the one or more processors may operate in the capacity of a server or a endpoint machine, e.g., an endpoint as described herein, e.g., in a server-endpoint network environment, or as a peer machine in a peer-to-peer or distributed network environment. The term "processing system" encompasses all such possibilities, unless explicitly excluded or otherwise defined herein. The one or more processors may form or be included in an endpoint of a conference system, or any machine capable of executing a set of instructions (sequential or otherwise) that specify actions to be taken by that machine. What specific forms of a processing system are included and/or excluded may be clear from the context of this specification.

Note that while some diagram(s) may only show a single processor and a single storage unit, e.g., a single memory that stores the logic including instructions, those skilled in the art will understand that many of the components described above are included, but not explicitly shown or described in order not to obscure the inventive aspect. For example, while only a single machine is illustrated, the term machine shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a an endpoint of a conference system, an apparatus such as a data processing system, logic, e.g., embodied in a non-transitory computer-readable medium, or a non-transitory computer-readable medium that is encoded with instructions. Accordingly, aspects of the present invention may take the form of a method, an entirely hardware embodiment, an entirely software embodiment, or an embodiment combining software and hardware aspects. Furthermore, embodiments of the present invention may take the form of program logic, e.g., a computer program on a non-transitory computer-readable medium, or the non-transitory computer-readable medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system or programming model.

Reference throughout this specification to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the claims presented herein, inventive aspects lie in less than all features of a single foregoing disclosed embodiment. Thus, the claims are hereby expressly incorporated into this DESCRIPTION OF EXAMPLE EMBODIMENTS, with each claim standing on its own as one separate embodiment, or, in the case of a multiply-dependent claim, as a plurality of separate embodiments of this invention.

Furthermore, while some embodiments described herein include some but not other features included in other embodiments, combinations of features of different embodiments are meant to be within the scope of the invention, and form different embodiments, as would be understood by those skilled in the art. For example, in claims presented herein, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives first, second, third, etc., to describe a common object, merely indicate that different instances of like objects are being referred to, and are not intended to imply that the objects so described must be in a given sequence, either temporally, spatially, in ranking, or in any other manner.

All U.S. patents, U.S. provisional and utility patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms "comprising," "comprised of," or "which comprises" is an open term that means including at least the elements/features that follow, but not excluding others. Thus, the term "comprising," when used in the claims, should not be interpreted as being limited to the means or elements or steps listed thereafter. For example, the scope of the expression "a device comprising A and B" should not be limited to devices consisting of only elements A and B. Any one of the terms "including" or "which includes" or "that includes" as used herein is also an open term that also means including at least the elements/features that follow the term, but not excluding others. Thus, "including" is synonymous with and means comprising.

Similarly, it is to be noticed that the term "coupled", when used in the claims, should not be interpreted as being limited to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other, but yet still cooperate or interact with each other.

In addition, recitations of indefinite articles "a" or "an" or "some" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that alternate embodiments of the invention may include modifications and other elements, and it is intended to claim all such modifications and other elements, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described herein. The scope of the present invention is defined by the claims of this application.

What is claimed is:

1. A method in a soundfield-capturing endpoint of a communication system, wherein the endpoint includes a user interface for accepting input from a user, the method comprising:

capturing a local soundfield using a microphone array;

input processing the captured soundfield, including pre-processing and auditory scene analysis (ASA) to detect local sound objects and their relative positions, and de-cluttering the detected sound objects to form a de-cluttered local auditory scene;

coding the de-cluttered auditory scene to form coded scene data comprising mono audio and scene data, the mono audio and the scene data in combination containing information regarding the captured soundfield;

generating, in response to at least one of coding the de-cluttered auditory scene or received coded scene data from other endpoints of the communication system, display signals for a display unit that, in response to the display signals, displays a representation of at least one sound object in the received coded scene data or of the coded de-cluttered local auditory scene, the at least one sound object including a detected local sound object having a displayed location;

receiving a sound object placement input, via the user interface, regarding a modified placement of the detected local sound object in the captured soundfield, the modified placement being different from a detected relative position of the detected local sound object;

modifying a positioning of the detected local sound object in the captured soundfield based on the sound object placement input;

modifying the coded scene data to include information regarding the modified positioning of the detected local sound object in the captured soundfield based on the sound object placement input;

modifying the generated display signals by modifying the displayed location of the detected local sound object based on the sound object placement input; and sending the coded scene data to one or more other endpoints or a controller communication system.

2. The method as recited in claim 1, wherein the displayed at least one object is at least one of the local de-cluttered auditory scene or of a summary of activity in the communication system determined from the received coded scene data.

3. The method as recited in claim 1, further comprising generating rendering data associated with the coded scene data and combining the rendering data with the associated coded scene data to form an endpoint scene dataset, such that the sending involves sending the endpoint scene dataset.

4. The method as recited in claim 1, wherein the displayed at least one object includes remote sound objects in a summary of activity in the communication system determined from the received coded scene data, wherein the user interface also provides capability for the user to select an object and manipulate at least one aspect of the selected object, the method further comprising accepting user input from the user interface, selecting an object according to the accepted user input, and modifying one or more aspects of the selected object according to the accepted user input.

5. The method as recited in claim 4, wherein the at least one aspect of the selected object includes at least one of focusing on an area of the selected object or suppressing other areas of capture.

6. The method as recited in claim 1, further comprising:

receiving coded data of an auditory scene of remote sound objects, the received coded data sent by at least one of a remote endpoint or a controller of the communication system;

decoding the received coded data;

rendering selected ones of remote sound objects of the decoded received data for output via a loudspeaker set such that a local user of the endpoint is provided with a sense of space with different sound objects perceived as emanating from different locations;

generating signals for the display unit that displays information about the remote sound objects on the included shaped ribbon display element that has an extent with locations on the extent representing locations of the auditory scene or a summary of activity in the communication system, wherein the generated display signals include the property that different remote sound objects are displayed at different locations on the extent of the ribbon element.

7. A device for operating in a communication system, the device comprising:

a microphone array that when operating captures a local soundfield and converts the local soundfield to a plurality of audio input signals;

an input audio processor and coder accepting the plurality of audio input signals, the processor and coder including a pre-processor and a scene analyzer that when operating performs auditory scene analysis (ASA), the ASA including detecting and identifying sound objects, de-cluttering the identified sound objects to form de-cluttered data, and forming an auditory scene of the soundfield;

a display unit including one or more display elements having an extent, each being shaped in extent, the extent representative of regions of capture and regions of audio source locations;

a display processor that when operating generates and output data to be displayed on the display unit, wherein responsive to receiving one or more streams audio data, the data displayed is representative of the received streams of audio data with different locations for the identified sound objects; and a user interface for accepting sound object placement input from a user regarding a modified placement of a local sound object of the identified sound objects in the captured local soundfield, the modified placement being different from a detected location of the local sound object, wherein the input audio processor and coder is configured for modifying a positioning of the local sound object in the captured local soundfield according to the sound object placement input, the data displayed being modified by modifying the positioning of the local sound object in the captured local soundfield according to the sound object placement input.

8. The device as recited in claim 7, wherein the data displayed is also representative of a locally determined auditory scene of the captured soundfield.

9. The device as recited in claim 7, further comprising a user interface (UI) and a UI processor accepting control data input by a user such that the user is able to control one or more aspects of the pre-processing, wherein the communication system is a conference system, and wherein display unit displays representations of conference communicants on the one or more display elements, wherein the representations of at least two communicants are different, wherein the representations are chosen from the group consisting of shapes, colors, lines, and animations, and wherein each representation relates to a category to which the corresponding communicant belongs.

10. The device as recited in claim 9, wherein the device is further configured for displaying conference-related information on the display unit and wherein the conference-related information includes at least one of network connectivity, dial-in device status, acquired audio signal strength, noise floor measure, nuisance measure, conference server status, current audio rendering position indicator, endpoint device used, talking direction, activity detection, audio mixing strategy indicator, statistics, conference equipment used, portion of participation activity of at least one communicant relative to at least one further communicant, sensor information or system information.

11. The device as recited in claim 9, wherein at least one representation of the at least one communicant can be activated to cause a selected processing operation to be applied to the corresponding at least one communicant; and
    wherein the selected processing operation is selected from a set consisting of: audio muting, designating the at least one communicant a dominant talker, applying an audio processing function to an audio stream related to at least one communicant, initiating a private communication with at least one communicant, assigning a new auditory scene position, and changing an audio volume.

12. The device as recited in claim 9, wherein the display processor is configured such that, when operating, it maintains the displayed representation of at least one communicant at a same display position upon said communicant changing his endpoint device during the conference.

13. The device as recited in claim 9, further comprising a meeting template pre-populated with display positions, wherein at least some representations are displayed at the display positions upon respective communicants joining the conference.

14. The device as recited in claim 9, further comprising an auditory scene placement memory, and an output processor that when operating stores placements of at least some communicants in an auditory scene of a conference in the auditory scene placement memory.

15. The device as recited in claim 14, wherein at least one of the stored placements is selected by a communicant of a remote endpoint device
    wherein the output processor that when operating stores a plurality of user-related placements in the auditory scene placement memory and to compute at least one preferred auditory scene from the plurality of user-related placements.

16. The device as recited in claim 9, further including an activity indicator for displaying voice activity of at least one endpoint microphone.

17. The device as recited in claim 16, wherein the activity indicator displays the voice activity in relation to a talking direction.

18. The device as recited in claim 7, wherein the device includes
    a receiver subsystem receiving audio data from one or more remote communicants, a server, or both the one or more remote communicants and the server,
    and further comprising a set of one or more loudspeakers, and an output audio processor that when operating carries out: rendering audio and outputting rendered audio signals to the set of one or more loudspeakers,
    wherein, responsive to receiving the audio data, the received audio data is rendered such that a local listener is able to perceive sound objects emanating sounds from different directions and
    wherein the receiver subsystem receives coded data sets of an auditory scene of remote sound objects, and wherein the display is representative of sound objects corresponding to one or more of the remote sound objects of the received coded data sets.

* * * * *